(12) United States Patent
Stephens et al.

(10) Patent No.: US 11,155,150 B2
(45) Date of Patent: Oct. 26, 2021

(54) COOLING SYSTEM INTEGRATED WITH VEHICLE BATTERY TRAY

(71) Applicant: Shape Corp., Grand Haven, MI (US)

(72) Inventors: Mark Charles Stephens, Grand Rapids, MI (US); Joseph Robert Matecki, Allendale, MI (US); Leonhard Fahreddin, San Jose, CA (US); Helen Weykamp, Grand Haven, MI (US)

(73) Assignee: Shape Corp., Grand Haven, MI (US)

( * ) Notice: Subject to any disclaimer, the term of this patent is extended or adjusted under 35 U.S.C. 154(b) by 0 days.

(21) Appl. No.: 17/009,237

(22) Filed: Sep. 1, 2020

(65) Prior Publication Data

US 2020/0398652 A1 Dec. 24, 2020

Related U.S. Application Data

(63) Continuation-in-part of application No. PCT/US2019/019964, filed on Feb. 28, 2020.
(Continued)

(51) Int. Cl.
*B60K 37/00* (2006.01)
*B60K 1/04* (2019.01)
(Continued)

(52) U.S. Cl.
CPC ............... *B60K 1/04* (2013.01); *B60K 11/02* (2013.01); *B60L 58/26* (2019.02); *B62D 25/025* (2013.01);
(Continued)

(58) Field of Classification Search
CPC .... B60K 1/04; B60K 1/00; B60K 2001/0405; B60K 2001/005; B60K 2001/0438;
(Continued)

(56) References Cited

U.S. PATENT DOCUMENTS 3,708,028 A 1/1973 Hafer
3,930,552 A 1/1976 Kunkle et al.
(Continued)

FOREIGN PATENT DOCUMENTS

AT 511428 A1 11/2012
AT 511670 A1 1/2013
(Continued)

OTHER PUBLICATIONS

International Searching Authority (KR), International Search Report and Written Opinion for International Application No. PCT/IB2017/055002, dated Jul. 19, 2018.
(Continued)

*Primary Examiner* — James M Dolak
(74) *Attorney, Agent, or Firm* — Bodman PLC

(57) ABSTRACT

A battery support tray for an electric vehicle includes a tray floor structure that has an upper surface that is configured to interface with battery modules. The battery support tray also includes a plurality of cooling features that integrally extend along portions of the tray floor structure that are configured to draw heat away from the battery modules supported at the upper surface of the tray floor structure. The tray floor structure may also have a cross-sectional profile that is substantially consistent longitudinally along a length of the tray floor structure or laterally across a width of the tray floor structure, such as formed from extruding a metal, such as an aluminum alloy.

8 Claims, 18 Drawing Sheets

Related U.S. Application Data

(60) Provisional application No. 62/637,155, filed on Mar. 1, 2018.

(51) Int. Cl.
*B60L 58/26* (2019.01)
*B60K 11/02* (2006.01)
*B62D 25/02* (2006.01)
*B62D 25/20* (2006.01)
*B60K 1/00* (2006.01)

(52) U.S. Cl.
CPC .... *B62D 25/2036* (2013.01); *B60K 2001/005* (2013.01); *B60K 2001/0405* (2013.01)

(58) Field of Classification Search
CPC ......... B60K 11/02; B60K 11/00; B60L 58/26; B60L 58/00; B60L 58/24; B60L 50/00; B60L 50/60; B60L 50/64; B60L 50/66; B62D 25/00; B62D 25/02; B62D 25/025; B62D 25/20; B62D 25/2036; H01M 50/20; H01M 50/204; H01M 10/6556; H01M 10/6567; H01M 10/613; H01M 10/60; H01M 10/655
See application file for complete search history.

(56) References Cited

U.S. PATENT DOCUMENTS

| | | | |
|---|---|---|---|
| 3,983,952 A | 10/1976 | McKee | |
| 4,174,014 A | 11/1979 | Bjorksten | |
| 4,252,206 A | 2/1981 | Burkholder et al. | |
| 4,317,497 A | 3/1982 | Alt et al. | |
| 4,339,015 A | 7/1982 | Fowkes et al. | |
| 4,506,748 A | 3/1985 | Thomas | |
| 5,015,545 A | 5/1991 | Brooks | |
| 5,198,638 A | 3/1993 | Massacesi | |
| 5,378,555 A | 1/1995 | Waters et al. | |
| 5,390,754 A | 2/1995 | Masuyama et al. | |
| 5,392,873 A | 2/1995 | Masuyama et al. | |
| 5,476,151 A | 12/1995 | Tsuchida et al. | |
| 5,501,289 A | 3/1996 | Nishikawa et al. | |
| 5,513,721 A | 5/1996 | Ogawa et al. | |
| 5,523,666 A | 6/1996 | Hoelzl et al. | |
| 5,534,364 A | 7/1996 | Watanabe et al. | |
| 5,549,443 A | 8/1996 | Hammerslag | |
| 5,555,950 A | 9/1996 | Harada et al. | |
| 5,558,949 A | 9/1996 | Iwatsuki et al. | |
| 5,561,359 A | 10/1996 | Matsuura et al. | |
| 5,567,542 A | 10/1996 | Bae | |
| 5,585,204 A | 12/1996 | Oshida et al. | |
| 5,585,205 A | 12/1996 | Kohchi | |
| 5,612,606 A | 3/1997 | Guimarin et al. | |
| 5,620,057 A * | 4/1997 | Klemen | H01M 10/613 180/68.5 |
| 5,678,760 A * | 10/1997 | Muso | H01M 10/613 237/2 A |
| 5,709,280 A | 1/1998 | Beckley et al. | |
| 5,736,272 A | 4/1998 | Veenstra et al. | |
| 5,760,569 A | 6/1998 | Chase, Jr. | |
| 5,833,023 A | 11/1998 | Shimizu | |
| 5,853,058 A | 12/1998 | Endo et al. | |
| 5,866,276 A | 2/1999 | Ogami et al. | |
| 5,934,053 A | 8/1999 | Fillman et al. | |
| 6,040,080 A | 3/2000 | Minami et al. | |
| 6,079,984 A | 6/2000 | Torres et al. | |
| 6,085,854 A | 7/2000 | Nishikawa | |
| 6,094,927 A | 8/2000 | Anazawa et al. | |
| 6,109,380 A | 8/2000 | Veenstra | |
| 6,130,003 A | 10/2000 | Etoh et al. | |
| 6,158,538 A | 12/2000 | Botzelmann et al. | |
| 6,188,574 B1 | 2/2001 | Anazawa | |
| 6,189,635 B1 | 2/2001 | Schuler et al. | |
| 6,220,380 B1 | 4/2001 | Mita et al. | |
| 6,227,322 B1 | 5/2001 | Nishikawa | |
| 6,260,645 B1 | 7/2001 | Pawlowski et al. | |
| 6,402,229 B1 | 6/2002 | Suganuma | |
| 6,406,812 B1 | 6/2002 | Dreulle et al. | |
| 6,462,949 B1 | 10/2002 | Parish, IV et al. | |
| 6,541,151 B2 | 4/2003 | Minamiura et al. | |
| 6,541,154 B2 | 4/2003 | Oogami et al. | |
| 6,565,836 B2 | 5/2003 | Ovshinsky et al. | |
| 6,598,691 B2 | 7/2003 | Mita et al. | |
| 6,648,090 B2 | 11/2003 | Iwase | |
| 6,668,957 B2 | 12/2003 | King | |
| 6,736,229 B1 | 5/2004 | Amori et al. | |
| 6,811,197 B1 | 11/2004 | Grabowski et al. | |
| 7,004,274 B2 | 2/2006 | Shibasawa et al. | |
| 7,017,361 B2 | 3/2006 | Kwon | |
| 7,070,015 B2 | 7/2006 | Mathews et al. | |
| 7,128,999 B1 | 10/2006 | Martin et al. | |
| 7,201,384 B2 | 4/2007 | Chaney | |
| 7,207,405 B2 | 4/2007 | Reid et al. | |
| 7,221,123 B2 | 5/2007 | Chen | |
| 7,249,644 B2 | 7/2007 | Honda et al. | |
| 7,267,190 B2 | 9/2007 | Hirano | |
| 7,323,272 B2 | 1/2008 | Ambrosio et al. | |
| 7,401,669 B2 | 7/2008 | Fujii et al. | |
| 7,405,022 B2 | 7/2008 | Kang et al. | |
| 7,412,309 B2 | 8/2008 | Honda | |
| 7,416,039 B1 | 8/2008 | Anderson et al. | |
| 7,424,926 B2 | 9/2008 | Tsuchiya | |
| 7,427,156 B2 | 9/2008 | Ambrosio et al. | |
| 7,501,793 B2 | 3/2009 | Kadouchi et al. | |
| 7,507,499 B2 | 3/2009 | Zhou et al. | |
| 7,520,355 B2 | 4/2009 | Chaney | |
| 7,610,978 B2 | 11/2009 | Takasaki et al. | |
| 7,654,351 B2 | 2/2010 | Koike et al. | |
| 7,654,352 B2 | 2/2010 | Takasaki et al. | |
| 7,661,370 B2 | 2/2010 | Pike et al. | |
| 7,686,111 B2 | 3/2010 | Koenekamp et al. | |
| 7,687,192 B2 | 3/2010 | Yoon et al. | |
| 7,713,655 B2 | 5/2010 | Ha et al. | |
| 7,749,644 B2 | 7/2010 | Nishino | |
| 7,807,288 B2 | 10/2010 | Yoon et al. | |
| 7,823,671 B2 * | 11/2010 | Inoue | B60L 3/003 180/68.4 |
| 7,854,282 B2 | 12/2010 | Lee et al. | |
| 7,858,229 B2 | 12/2010 | Shin et al. | |
| 7,875,378 B2 | 1/2011 | Yang et al. | |
| 7,879,480 B2 | 2/2011 | Yoon et al. | |
| 7,879,485 B2 | 2/2011 | Yoon et al. | |
| 7,926,602 B2 | 4/2011 | Takasaki | |
| 7,931,105 B2 | 4/2011 | Sato et al. | |
| 7,948,207 B2 | 5/2011 | Scheucher | |
| 7,967,093 B2 | 6/2011 | Nagasaka | |
| 7,984,779 B2 | 7/2011 | Boegelein et al. | |
| 7,990,105 B2 | 8/2011 | Matsumoto et al. | |
| 7,993,155 B2 | 8/2011 | Heichal et al. | |
| 7,997,368 B2 | 8/2011 | Takasaki et al. | |
| 8,006,626 B2 | 8/2011 | Kumar et al. | |
| 8,006,793 B2 | 8/2011 | Heichal et al. | |
| 8,012,620 B2 | 9/2011 | Takasaki et al. | |
| 8,034,476 B2 | 10/2011 | Ha et al. | |
| 8,037,954 B2 | 10/2011 | Taguchi | |
| 8,079,435 B2 | 12/2011 | Takasaki et al. | |
| 8,091,669 B2 | 1/2012 | Taneda et al. | |
| 8,110,300 B2 | 2/2012 | Niedzwiecki et al. | |
| 8,146,694 B2 | 4/2012 | Hamidi | |
| 8,163,420 B2 | 4/2012 | Okada et al. | |
| 8,167,070 B2 | 5/2012 | Takamura et al. | |
| 8,186,468 B2 | 5/2012 | Parrett et al. | |
| 8,187,736 B2 | 5/2012 | Park et al. | |
| 8,205,702 B2 | 6/2012 | Hoermandinger et al. | |
| 8,206,846 B2 | 6/2012 | Yang et al. | |
| 8,210,301 B2 | 7/2012 | Hashimoto et al. | |
| 8,211,564 B2 | 7/2012 | Choi et al. | |
| 8,256,552 B2 | 9/2012 | Okada | |
| 8,268,469 B2 | 9/2012 | Hermann et al. | |
| 8,268,472 B2 | 9/2012 | Ronning et al. | |
| 8,276,697 B2 | 10/2012 | Takasaki | |
| 8,286,743 B2 | 10/2012 | Rawlinson | |
| 8,298,698 B2 | 10/2012 | Chung et al. | |

(56) References Cited

U.S. PATENT DOCUMENTS

| | | |
|---|---|---|
| 8,304,104 B2 | 11/2012 | Lee et al. |
| 8,307,930 B2 | 11/2012 | Sailor et al. |
| 8,323,819 B2 | 12/2012 | Lee et al. |
| 8,327,962 B2 | 12/2012 | Bergmeier et al. |
| 8,343,647 B2 | 1/2013 | Ahn et al. |
| 8,353,374 B2 | 1/2013 | Sugawara et al. |
| 8,371,401 B1 | 2/2013 | Illustrato |
| 8,397,853 B2 | 3/2013 | Stefani et al. |
| 8,409,743 B2 | 4/2013 | Okada et al. |
| 8,418,795 B2 | 4/2013 | Sasage et al. |
| 8,420,245 B2 | 4/2013 | Im et al. |
| 8,439,144 B2 | 5/2013 | Murase |
| 8,453,773 B2 | 6/2013 | Hill et al. |
| 8,453,778 B2 | 6/2013 | Bannier et al. |
| 8,455,122 B2 | 6/2013 | Shin et al. |
| 8,465,866 B2 | 6/2013 | Kim |
| 8,481,343 B2 | 7/2013 | Hsin et al. |
| 8,486,557 B2 | 7/2013 | Lee et al. |
| 8,492,016 B2 | 7/2013 | Shin et al. |
| 8,501,344 B2 | 8/2013 | Yang et al. |
| 8,511,412 B2 | 8/2013 | Kawaguchi et al. |
| 8,540,282 B2 | 9/2013 | Yoda et al. |
| 8,551,640 B2 | 10/2013 | Hedrich et al. |
| 8,557,425 B2 | 10/2013 | Ronning et al. |
| 8,561,743 B2 | 10/2013 | Iwasa et al. |
| 8,563,155 B2 | 10/2013 | Lee et al. |
| 8,567,543 B2 | 10/2013 | Kubota et al. |
| 8,584,780 B2 | 11/2013 | Yu et al. |
| 8,587,907 B2 | 11/2013 | Gaben |
| 8,592,069 B1 | 11/2013 | Anderson et al. |
| 8,602,139 B2 | 12/2013 | Takamura et al. |
| 8,609,271 B2 | 12/2013 | Yoon et al. |
| 8,658,303 B2 | 2/2014 | Chung et al. |
| 8,672,077 B2 | 3/2014 | Sand et al. |
| 8,672,354 B2 | 3/2014 | Kim et al. |
| 8,689,918 B2 | 4/2014 | Yu et al. |
| 8,689,919 B2 | 4/2014 | Maeda et al. |
| 8,691,414 B2 * | 4/2014 | Kim ............... H01M 10/625 429/120 |
| 8,691,421 B2 | 4/2014 | Lee et al. |
| 8,708,080 B2 | 4/2014 | Lee et al. |
| 8,708,402 B2 | 4/2014 | Saeki |
| 8,709,628 B2 | 4/2014 | Carignan et al. |
| 8,722,224 B2 | 5/2014 | Lee et al. |
| 8,728,648 B2 | 5/2014 | Choo et al. |
| 8,733,486 B2 | 5/2014 | Nishiura et al. |
| 8,733,488 B2 | 5/2014 | Umetani |
| 8,739,908 B2 | 6/2014 | Taniguchi et al. |
| 8,739,909 B2 | 6/2014 | Hashimoto et al. |
| 8,741,466 B2 | 6/2014 | Youngs et al. |
| 8,746,391 B2 | 6/2014 | Atsuchi et al. |
| 8,757,304 B2 | 6/2014 | Amano et al. |
| 8,789,634 B2 | 7/2014 | Nitawaki |
| 8,794,365 B2 | 8/2014 | Matsuzawa et al. |
| 8,802,259 B2 | 8/2014 | Lee et al. |
| 8,803,477 B2 | 8/2014 | Kittell |
| 8,808,893 B2 | 8/2014 | Choo et al. |
| 8,818,588 B2 | 8/2014 | Ambrosio et al. |
| 8,820,444 B2 | 9/2014 | Nguyen |
| 8,820,461 B2 | 9/2014 | Shinde et al. |
| 8,827,023 B2 | 9/2014 | Matsuda et al. |
| 8,833,495 B2 | 9/2014 | Iwata et al. |
| 8,833,499 B2 | 9/2014 | Rawlinson |
| 8,835,033 B2 | 9/2014 | Choi et al. |
| 8,841,013 B2 | 9/2014 | Choo et al. |
| 8,846,233 B2 | 9/2014 | Lee et al. |
| 8,846,234 B2 | 9/2014 | Lee et al. |
| 8,852,794 B2 | 10/2014 | Laitinen |
| 8,862,296 B2 | 10/2014 | Kurakawa et al. |
| 8,865,332 B2 | 10/2014 | Yang et al. |
| 8,875,828 B2 | 11/2014 | Rawlinson et al. |
| 8,895,173 B2 | 11/2014 | Gandhi et al. |
| 8,900,736 B2 | 12/2014 | Choi et al. |
| 8,905,170 B2 | 12/2014 | Kyoden et al. |
| 8,905,171 B2 | 12/2014 | Lee et al. |
| 8,911,899 B2 | 12/2014 | Lim et al. |
| 8,936,125 B2 | 1/2015 | Nakamori |
| 8,939,245 B2 | 1/2015 | Jaffrezic |
| 8,939,246 B2 | 1/2015 | Yamaguchi et al. |
| 8,951,655 B2 | 2/2015 | Chung et al. |
| 8,960,346 B2 | 2/2015 | Ogawa |
| 8,970,061 B2 | 3/2015 | Nakagawa et al. |
| 8,973,697 B2 | 3/2015 | Matsuda |
| 8,975,774 B2 | 3/2015 | Kreutzer et al. |
| 8,978,800 B2 | 3/2015 | Soma' et al. |
| 8,980,458 B2 | 3/2015 | Honjo et al. |
| 8,986,864 B2 | 3/2015 | Wiegmann et al. |
| 9,004,535 B2 | 4/2015 | Wu |
| 9,012,051 B2 | 4/2015 | Lee et al. |
| 9,017,846 B2 | 4/2015 | Kawatani et al. |
| 9,023,502 B2 | 5/2015 | Favaretto |
| 9,023,503 B2 | 5/2015 | Seong et al. |
| 9,024,572 B2 | 5/2015 | Nishihara et al. |
| 9,033,084 B2 | 5/2015 | Joye |
| 9,033,085 B1 * | 5/2015 | Rawlinson .......... B60L 11/1877 180/68.5 |
| 9,034,502 B2 | 5/2015 | Kano et al. |
| 9,052,168 B1 | 6/2015 | Rawlinson |
| 9,054,402 B1 | 6/2015 | Rawlinson |
| 9,061,714 B1 | 6/2015 | Albery et al. |
| 9,065,103 B2 | 6/2015 | Straubel et al. |
| 9,070,926 B2 | 6/2015 | Seong et al. |
| 9,073,426 B2 | 7/2015 | Tachikawa et al. |
| 9,073,498 B2 | 7/2015 | Lee |
| 9,077,058 B2 | 7/2015 | Yang et al. |
| 9,090,218 B2 | 7/2015 | Karashima |
| 9,093,701 B2 | 7/2015 | Kawatani et al. |
| 9,101,060 B2 | 8/2015 | Yamanaka et al. |
| 9,102,362 B2 | 8/2015 | Baccouche et al. |
| 9,126,637 B2 | 9/2015 | Eberle et al. |
| 9,136,514 B2 | 9/2015 | Kawatani et al. |
| 9,156,340 B2 | 10/2015 | van den Akker |
| 9,159,968 B2 | 10/2015 | Park et al. |
| 9,159,970 B2 | 10/2015 | Watanabe et al. |
| 9,160,042 B2 | 10/2015 | Fujii et al. |
| 9,160,214 B2 | 10/2015 | Matsuda |
| 9,172,071 B2 | 10/2015 | Yoshioka et al. |
| 9,174,520 B2 | 11/2015 | Katayama et al. |
| 9,184,477 B2 | 11/2015 | Jeong et al. |
| 9,192,450 B2 | 11/2015 | Yamashita et al. |
| 9,193,316 B2 | 11/2015 | McLaughlin et al. |
| 9,196,882 B2 | 11/2015 | Seong et al. |
| 9,203,064 B2 | 12/2015 | Lee et al. |
| 9,203,124 B2 | 12/2015 | Chung et al. |
| 9,205,749 B2 | 12/2015 | Sakamoto |
| 9,205,757 B2 | 12/2015 | Matsuda |
| 9,216,638 B2 | 12/2015 | Katayama et al. |
| 9,227,582 B2 | 1/2016 | Katayama et al. |
| 9,231,285 B2 | 1/2016 | Schmidt et al. |
| 9,236,587 B2 | 1/2016 | Lee et al. |
| 9,236,589 B2 | 1/2016 | Lee |
| 9,238,495 B2 | 1/2016 | Matsuda |
| 9,246,148 B2 | 1/2016 | Maguire |
| 9,252,409 B2 | 2/2016 | Lee et al. |
| 9,254,871 B2 | 2/2016 | Hotta et al. |
| 9,263,249 B2 | 2/2016 | Tomohiro et al. |
| 9,269,934 B2 | 2/2016 | Yang et al. |
| 9,277,674 B2 | 3/2016 | Watanabe |
| 9,281,505 B2 | 3/2016 | Hihara et al. |
| 9,281,546 B2 | 3/2016 | Chung et al. |
| 9,283,837 B1 | 3/2016 | Rawlinson |
| 9,306,201 B2 | 4/2016 | Lu et al. |
| 9,306,247 B2 | 4/2016 | Rawlinson |
| 9,308,829 B2 | 4/2016 | Matsuda |
| 9,308,966 B2 | 4/2016 | Kosuge et al. |
| 9,312,579 B2 | 4/2016 | Jeong et al. |
| 9,321,357 B2 | 4/2016 | Caldeira et al. |
| 9,321,433 B2 | 4/2016 | Yin et al. |
| 9,327,586 B2 | 5/2016 | Miyashiro |
| 9,331,321 B2 | 5/2016 | Berger et al. |
| 9,331,366 B2 | 5/2016 | Fuerstner et al. |
| 9,333,868 B2 | 5/2016 | Uchida et al. |
| 9,337,455 B2 | 5/2016 | Yang et al. |
| 9,337,457 B2 | 5/2016 | Yajima et al. |

(56) References Cited

U.S. PATENT DOCUMENTS

| | | |
|---|---|---|
| 9,337,458 B2 | 5/2016 | Kim |
| 9,337,516 B2 | 5/2016 | Klausner et al. |
| 9,346,346 B2 | 5/2016 | Murray |
| 9,350,003 B2 | 5/2016 | Wen et al. |
| 9,358,869 B2 | 6/2016 | Le Jaouen et al. |
| 9,373,828 B2 | 6/2016 | Kawatani et al. |
| 9,381,798 B2 | 7/2016 | Meyer-Ebeling |
| 9,412,984 B2 | 8/2016 | Fritz et al. |
| 9,413,043 B2 | 8/2016 | Kim et al. |
| 9,425,628 B2 | 8/2016 | Pham et al. |
| 9,434,243 B2 | 9/2016 | Nakao |
| 9,434,270 B1 | 9/2016 | Penilla et al. |
| 9,434,333 B2 | 9/2016 | Sloan et al. |
| 9,437,903 B2 * | 9/2016 | DeKeuster .......... H01M 10/625 |
| 9,444,082 B2 | 9/2016 | Tsujimura et al. |
| 9,446,643 B1 | 9/2016 | Vollmer |
| 9,450,228 B2 | 9/2016 | Sakai et al. |
| 9,452,686 B2 | 9/2016 | Yang et al. |
| 9,457,666 B2 | 10/2016 | Caldeira et al. |
| 9,461,284 B2 | 10/2016 | Power et al. |
| 9,461,454 B2 | 10/2016 | Auguet et al. |
| 9,463,695 B2 | 10/2016 | Matsuda et al. |
| 9,478,778 B2 | 10/2016 | Im et al. |
| 9,481,249 B2 | 11/2016 | Yamazaki |
| 9,484,564 B2 | 11/2016 | Stuetz et al. |
| 9,484,592 B2 | 11/2016 | Roh et al. |
| 9,487,237 B1 | 11/2016 | Vollmer |
| 9,502,700 B2 | 11/2016 | Haussman |
| 9,520,624 B2 | 12/2016 | Lee et al. |
| 9,530,994 B2 * | 12/2016 | Pierre ................. H01M 10/613 |
| 9,531,041 B2 | 12/2016 | Hwang |
| 9,533,546 B2 | 1/2017 | Cheng |
| 9,533,600 B1 | 1/2017 | Schwab et al. |
| 9,537,186 B2 | 1/2017 | Chung et al. |
| 9,537,187 B2 | 1/2017 | Chung et al. |
| 9,540,055 B2 | 1/2017 | Berger et al. |
| 9,545,962 B2 | 1/2017 | Pang |
| 9,545,968 B2 | 1/2017 | Miyashiro et al. |
| 9,561,735 B2 | 2/2017 | Nozaki |
| 9,564,663 B2 | 2/2017 | Kim et al. |
| 9,564,664 B2 | 2/2017 | Tanigaki et al. |
| 9,579,963 B2 | 2/2017 | Landgraf |
| 9,579,983 B2 | 2/2017 | Inoue |
| 9,579,986 B2 | 2/2017 | Bachir |
| 9,590,216 B2 | 3/2017 | Maguire et al. |
| 9,597,973 B2 | 3/2017 | Penilla et al. |
| 9,597,976 B2 | 3/2017 | Dickinson et al. |
| 9,608,244 B2 | 3/2017 | Shin et al. |
| 9,614,206 B2 | 4/2017 | Choi et al. |
| 9,614,260 B2 | 4/2017 | Kim et al. |
| 9,616,766 B2 | 4/2017 | Fujii |
| 9,620,826 B2 | 4/2017 | Yang et al. |
| 9,623,742 B2 | 4/2017 | Ikeda et al. |
| 9,623,911 B2 | 4/2017 | Kano et al. |
| 9,627,664 B2 | 4/2017 | Choo et al. |
| 9,627,666 B2 | 4/2017 | Baldwin |
| 9,630,483 B2 | 4/2017 | Yamada et al. |
| 9,636,984 B1 | 5/2017 | Baccouche et al. |
| 9,643,660 B2 | 5/2017 | Vollmer |
| 9,647,251 B2 | 5/2017 | Prinz et al. |
| 9,653,712 B2 | 5/2017 | Seong et al. |
| 9,660,236 B2 | 5/2017 | Kondo et al. |
| 9,660,288 B2 | 5/2017 | Gendlin et al. |
| 9,660,304 B2 | 5/2017 | Choi et al. |
| 9,673,433 B1 | 6/2017 | Pullalarevu et al. |
| 9,673,495 B2 | 6/2017 | Lee et al. |
| 9,692,095 B2 | 6/2017 | Harris |
| 9,694,772 B2 | 7/2017 | Ikeda et al. |
| 9,718,340 B2 | 8/2017 | Berger et al. |
| 9,789,908 B2 | 10/2017 | Tsukada et al. |
| 9,796,293 B2 * | 10/2017 | Ito ..................... H01M 10/625 |
| 9,796,424 B2 | 10/2017 | Sakaguchi et al. |
| 9,802,650 B2 | 10/2017 | Nishida et al. |
| 9,862,427 B2 * | 1/2018 | Berger ..................... B60K 1/04 |
| 9,912,023 B1 * | 3/2018 | Mastrandrea ...... H01M 10/6557 |
| 9,969,295 B2 * | 5/2018 | Mastrandrea ..... H01M 10/6556 |
| 10,020,470 B2 * | 7/2018 | Ito ............................ B60L 50/64 |
| 10,059,382 B2 | 8/2018 | Nusier et al. |
| 10,166,883 B2 * | 1/2019 | Brendecke .............. B60L 50/66 |
| 10,186,737 B2 * | 1/2019 | Iqbal ..................... H01M 50/20 |
| 10,468,645 B2 * | 11/2019 | Jackson .............. H01M 10/658 |
| 10,720,680 B2 * | 7/2020 | Shen ..................... H01M 50/20 |
| 10,886,513 B2 * | 1/2021 | Stephens ................. B60L 50/66 |
| 10,933,726 B2 * | 3/2021 | Handing ........... H01M 10/6556 |
| 10,950,904 B2 * | 3/2021 | Motoyoshi ........ H01M 10/6568 |
| 10,985,414 B2 * | 4/2021 | Kuboki ............... H01M 10/655 |
| 10,991,996 B2 * | 4/2021 | Huang ............... H01M 10/613 |
| 11,009,294 B2 * | 5/2021 | Robillon ............... F28D 1/0461 |
| 2001/0046624 A1 | 11/2001 | Goto et al. |
| 2001/0052433 A1 | 12/2001 | Harris et al. |
| 2002/0066608 A1 | 6/2002 | Guenard et al. |
| 2003/0089540 A1 | 5/2003 | Koike et al. |
| 2003/0188417 A1 | 10/2003 | McGlinchy et al. |
| 2003/0209375 A1 | 11/2003 | Suzuki et al. |
| 2003/0230443 A1 | 12/2003 | Cramer et al. |
| 2004/0142232 A1 | 7/2004 | Risca et al. |
| 2004/0261377 A1 | 12/2004 | Sung |
| 2005/0095500 A1 | 5/2005 | Corless et al. |
| 2006/0001399 A1 | 1/2006 | Salasoo et al. |
| 2006/0024566 A1 | 2/2006 | Plummer |
| 2008/0179040 A1 | 7/2008 | Rosenbaum |
| 2008/0199771 A1 | 8/2008 | Chiu |
| 2008/0238152 A1 | 10/2008 | Konishi et al. |
| 2008/0280192 A1 | 11/2008 | Drozdz et al. |
| 2008/0311468 A1 | 12/2008 | Hermann et al. |
| 2009/0014221 A1 | 1/2009 | Kim et al. |
| 2009/0058355 A1 | 3/2009 | Meyer |
| 2010/0025131 A1 | 2/2010 | Gloceri et al. |
| 2010/0112419 A1 | 5/2010 | Jang et al. |
| 2010/0159317 A1 | 6/2010 | Taghikhani et al. |
| 2010/0173191 A1 | 7/2010 | Meintschel et al. |
| 2010/0307848 A1 | 12/2010 | Hashimoto et al. |
| 2011/0036657 A1 | 2/2011 | Bland et al. |
| 2011/0070474 A1 | 3/2011 | Lee et al. |
| 2011/0104530 A1 | 5/2011 | Muller et al. |
| 2011/0123309 A1 | 5/2011 | Berdelle-Hilge et al. |
| 2011/0132580 A1 | 6/2011 | Herrmann et al. |
| 2011/0143179 A1 | 6/2011 | Nakamori |
| 2011/0168461 A1 | 7/2011 | Meyer-Ebeling |
| 2011/0240385 A1 | 10/2011 | Farmer |
| 2012/0091955 A1 | 4/2012 | Gao |
| 2012/0103714 A1 | 5/2012 | Choi et al. |
| 2012/0118653 A1 | 5/2012 | Ogihara et al. |
| 2012/0125702 A1 | 5/2012 | Bergfjord |
| 2012/0129031 A1 | 5/2012 | Kim |
| 2012/0160583 A1 | 6/2012 | Rawlinson |
| 2012/0223113 A1 | 9/2012 | Gaisne et al. |
| 2012/0298433 A1 | 11/2012 | Ohkura |
| 2012/0301765 A1 | 11/2012 | Loo et al. |
| 2012/0312610 A1 | 12/2012 | Kim et al. |
| 2013/0020139 A1 | 1/2013 | Kim et al. |
| 2013/0122337 A1 | 5/2013 | Katayama et al. |
| 2013/0122338 A1 | 5/2013 | Katayama et al. |
| 2013/0143081 A1 | 6/2013 | Watanabe et al. |
| 2013/0164580 A1 | 6/2013 | Au |
| 2013/0192908 A1 | 8/2013 | Schlagheck |
| 2013/0230759 A1 | 9/2013 | Jeong et al. |
| 2013/0270863 A1 | 10/2013 | Young et al. |
| 2013/0273829 A1 | 10/2013 | Obasih et al. |
| 2013/0284531 A1 | 10/2013 | Oonuma et al. |
| 2013/0337297 A1 | 12/2013 | Lee et al. |
| 2014/0017546 A1 | 1/2014 | Yanagi |
| 2014/0045026 A1 | 2/2014 | Fritz et al. |
| 2014/0072845 A1 | 3/2014 | Oh et al. |
| 2014/0072856 A1 | 3/2014 | Chung et al. |
| 2014/0087228 A1 | 3/2014 | Fabian et al. |
| 2014/0120406 A1 | 5/2014 | Kim |
| 2014/0141298 A1 | 5/2014 | Michelitsch |
| 2014/0178721 A1 | 6/2014 | Chung et al. |
| 2014/0193683 A1 | 7/2014 | Mardall et al. |
| 2014/0202671 A1 | 7/2014 | Yan |
| 2014/0212723 A1 | 7/2014 | Lee et al. |
| 2014/0242429 A1 | 8/2014 | Lee et al. |
| 2014/0246259 A1 | 9/2014 | Yamamura et al. |

(56) References Cited

U.S. PATENT DOCUMENTS

| | | |
|---|---|---|
| 2014/0262573 A1 | 9/2014 | Ito et al. |
| 2014/0272501 A1 | 9/2014 | O'Brien et al. |
| 2014/0284125 A1 | 9/2014 | Katayama et al. |
| 2014/0302360 A1 | 10/2014 | Klammler et al. |
| 2014/0322583 A1 | 10/2014 | Choi et al. |
| 2014/0338999 A1 | 11/2014 | Fujii et al. |
| 2015/0004458 A1 | 1/2015 | Lee |
| 2015/0010795 A1 | 1/2015 | Tanigaki et al. |
| 2015/0053493 A1 | 2/2015 | Kees et al. |
| 2015/0056481 A1 | 2/2015 | Cohen et al. |
| 2015/0060164 A1 | 3/2015 | Wang et al. |
| 2015/0061381 A1 | 3/2015 | Biskup |
| 2015/0061413 A1 | 3/2015 | Janarthanam et al. |
| 2015/0064535 A1 | 3/2015 | Seong et al. |
| 2015/0104686 A1 | 4/2015 | Brommer et al. |
| 2015/0136506 A1 | 5/2015 | Quinn et al. |
| 2015/0188207 A1 | 7/2015 | Son et al. |
| 2015/0204583 A1 | 7/2015 | Stephan et al. |
| 2015/0207115 A1 | 7/2015 | Wondraczek |
| 2015/0236326 A1 | 8/2015 | Kim et al. |
| 2015/0243956 A1 | 8/2015 | Loo et al. |
| 2015/0255764 A1 | 9/2015 | Loo et al. |
| 2015/0259011 A1 | 9/2015 | Deckard et al. |
| 2015/0280188 A1 | 10/2015 | Nozaki et al. |
| 2015/0291046 A1 | 10/2015 | Kawabata |
| 2015/0298661 A1 | 10/2015 | Zhang |
| 2015/0314830 A1 | 11/2015 | Inoue |
| 2015/0329174 A1 | 11/2015 | Inoue |
| 2015/0329175 A1 | 11/2015 | Inoue |
| 2015/0329176 A1 | 11/2015 | Inoue |
| 2015/0344081 A1 | 12/2015 | Kor et al. |
| 2016/0023689 A1 | 1/2016 | Berger et al. |
| 2016/0028056 A1 | 1/2016 | Lee et al. |
| 2016/0068195 A1 | 3/2016 | Hentrich et al. |
| 2016/0072108 A1 | 3/2016 | Keller et al. |
| 2016/0087319 A1 | 3/2016 | Roh et al. |
| 2016/0093856 A1 | 3/2016 | DeKeuster et al. |
| 2016/0133899 A1 | 5/2016 | Qiao et al. |
| 2016/0137046 A1 | 5/2016 | Song |
| 2016/0141738 A1 | 5/2016 | Kwag |
| 2016/0149177 A1 | 5/2016 | Sugeno et al. |
| 2016/0156005 A1 | 6/2016 | Elliot et al. |
| 2016/0159221 A1 | 6/2016 | Chen et al. |
| 2016/0164053 A1 | 6/2016 | Lee et al. |
| 2016/0167544 A1 | 6/2016 | Barbat et al. |
| 2016/0176312 A1 | 6/2016 | Duhaime et al. |
| 2016/0197332 A1 | 7/2016 | Lee et al. |
| 2016/0197386 A1 | 7/2016 | Moon et al. |
| 2016/0197387 A1 | 7/2016 | Lee et al. |
| 2016/0204398 A1 | 7/2016 | Moon et al. |
| 2016/0207418 A1 | 7/2016 | Bergstrom et al. |
| 2016/0218335 A1 | 7/2016 | Baek |
| 2016/0222631 A1 | 8/2016 | Kohno et al. |
| 2016/0226040 A1 | 8/2016 | Mongeau et al. |
| 2016/0226108 A1 | 8/2016 | Kim et al. |
| 2016/0229309 A1 | 8/2016 | Mitsutani |
| 2016/0233468 A1 | 8/2016 | Nusier et al. |
| 2016/0236713 A1 | 8/2016 | Sakaguchi et al. |
| 2016/0248060 A1 | 8/2016 | Brambrink et al. |
| 2016/0248061 A1 | 8/2016 | Brambrink et al. |
| 2016/0257219 A1 | 9/2016 | Miller et al. |
| 2016/0280306 A1 | 9/2016 | Miyashiro et al. |
| 2016/0308180 A1 | 10/2016 | Kohda |
| 2016/0318579 A1 | 11/2016 | Miyashiro |
| 2016/0339855 A1 | 11/2016 | Chinavare et al. |
| 2016/0347161 A1 | 12/2016 | Kusumi et al. |
| 2016/0361984 A1 | 12/2016 | Manganaro |
| 2016/0368358 A1 | 12/2016 | Nagaosa |
| 2016/0375750 A1 | 12/2016 | Hokazono et al. |
| 2017/0001507 A1 | 1/2017 | Ashraf et al. |
| 2017/0005303 A1 | 1/2017 | Harris et al. |
| 2017/0005371 A1 | 1/2017 | Chidester et al. |
| 2017/0005375 A1 | 1/2017 | Walker |
| 2017/0029034 A1 | 2/2017 | Faruque et al. |
| 2017/0047563 A1 | 2/2017 | Lee et al. |
| 2017/0050533 A1 | 2/2017 | Wei et al. |
| 2017/0054120 A1 | 2/2017 | Templeman et al. |
| 2017/0062782 A1 | 3/2017 | Cho et al. |
| 2017/0084890 A1 | 3/2017 | Subramanian et al. |
| 2017/0088013 A1 | 3/2017 | Shimizu et al. |
| 2017/0088178 A1 | 3/2017 | Tsukada et al. |
| 2017/0106907 A1 | 4/2017 | Gong et al. |
| 2017/0106908 A1 | 4/2017 | Song |
| 2017/0144566 A1 | 5/2017 | Aschwer et al. |
| 2017/0190243 A1 | 7/2017 | Duan et al. |
| 2017/0194681 A1 | 7/2017 | Kim et al. |
| 2017/0200925 A1 | 7/2017 | Seo et al. |
| 2017/0214018 A1 | 7/2017 | Sun et al. |
| 2017/0222199 A1 | 8/2017 | Idikurt et al. |
| 2017/0232859 A1 | 8/2017 | Li |
| 2017/0288185 A1 | 10/2017 | Maguire |
| 2017/0331086 A1 | 11/2017 | Frehn et al. |
| 2018/0050607 A1 | 2/2018 | Matecki et al. |
| 2018/0062224 A1 | 3/2018 | Drabon et al. |
| 2018/0154754 A1 | 6/2018 | Rowley et al. |
| 2018/0186227 A1 | 7/2018 | Stephens et al. |
| 2018/0229593 A1 | 8/2018 | Hitz et al. |
| 2018/0233789 A1 | 8/2018 | Iqbal et al. |
| 2018/0236863 A1 | 8/2018 | Kawabe et al. |
| 2018/0237075 A1 | 8/2018 | Kawabe et al. |
| 2018/0251102 A1* | 9/2018 | Han .................... H01M 50/20 |
| 2018/0323409 A1 | 11/2018 | Maier |
| 2018/0334022 A1 | 11/2018 | Rawlinson et al. |
| 2018/0337374 A1 | 11/2018 | Matecki et al. |
| 2018/0337377 A1 | 11/2018 | Stephens et al. |
| 2018/0337378 A1 | 11/2018 | Stephens et al. |
| 2019/0081298 A1 | 3/2019 | Matecki et al. |
| 2019/0100090 A1 | 4/2019 | Matecki et al. |

FOREIGN PATENT DOCUMENTS

| | | |
|---|---|---|
| AU | 2008200543 A1 | 8/2009 |
| CN | 100429805 C | 10/2008 |
| CN | 100429806 C | 10/2008 |
| CN | 102452293 A | 5/2012 |
| CN | 102802983 A | 11/2012 |
| CN | 103568820 A | 2/2014 |
| CN | 104010884 A | 8/2014 |
| CN | 106029407 A | 10/2016 |
| CN | 205645923 U | 10/2016 |
| CN | 106207029 A | 12/2016 |
| CN | 106410077 A | 2/2017 |
| DE | 4105246 A1 | 8/1992 |
| DE | 4129351 A1 | 5/1993 |
| DE | 4427322 A1 | 2/1996 |
| DE | 19534427 A1 | 3/1996 |
| DE | 4446257 A1 | 6/1996 |
| DE | 202005018897 U1 | 2/2006 |
| DE | 102004062932 A1 | 8/2006 |
| DE | 102007012893 A1 | 3/2008 |
| DE | 102007017019 A1 | 3/2008 |
| DE | 102007030542 A1 | 3/2008 |
| DE | 102006049269 A1 | 6/2008 |
| DE | 202008006698 U1 | 7/2008 |
| DE | 102007011026 A1 | 9/2008 |
| DE | 102007021293 A1 | 11/2008 |
| DE | 102007044526 A1 | 3/2009 |
| DE | 102007050103 A1 | 4/2009 |
| DE | 102007063187 B3 | 4/2009 |
| DE | 102008051786 A1 | 4/2009 |
| DE | 102007063194 A1 | 6/2009 |
| DE | 102008034880 A1 | 6/2009 |
| DE | 102007061562 A1 | 7/2009 |
| DE | 102008010813 A1 | 8/2009 |
| DE | 102008024007 A1 | 12/2009 |
| DE | 102008034695 A1 | 1/2010 |
| DE | 102008034700 A1 | 1/2010 |
| DE | 102008034856 A1 | 1/2010 |
| DE | 102008034860 A1 | 1/2010 |
| DE | 102008034863 A1 | 1/2010 |
| DE | 102008034873 A1 | 1/2010 |
| DE | 102008034889 A1 | 1/2010 |
| DE | 102008052284 A1 | 4/2010 |
| DE | 102008059953 A1 | 6/2010 |

(56) References Cited

FOREIGN PATENT DOCUMENTS

| | | |
|---|---|---|
| DE | 102008059964 A1 | 6/2010 |
| DE | 102008059966 A1 | 6/2010 |
| DE | 102008059967 A1 | 6/2010 |
| DE | 102008059969 A1 | 6/2010 |
| DE | 102008059971 A1 | 6/2010 |
| DE | 102008054968 A1 | 7/2010 |
| DE | 102010006514 A1 | 9/2010 |
| DE | 102009019384 A1 | 11/2010 |
| DE | 102009035488 A1 | 2/2011 |
| DE | 102009040598 A1 | 3/2011 |
| DE | 102010014484 A1 | 3/2011 |
| DE | 102009043635 A1 | 4/2011 |
| DE | 102010007414 A1 | 8/2011 |
| DE | 102010009063 A1 | 8/2011 |
| DE | 102010012992 A1 | 9/2011 |
| DE | 102010012996 A1 | 9/2011 |
| DE | 102010013025 A1 | 9/2011 |
| DE | 102010028728 A1 | 11/2011 |
| DE | 102011011698 A1 | 8/2012 |
| DE | 102011013182 A1 | 9/2012 |
| DE | 102011016526 A1 | 10/2012 |
| DE | 102011017459 A1 | 10/2012 |
| DE | 102011075820 A1 | 11/2012 |
| DE | 102011103990 A1 | 12/2012 |
| DE | 102011080053 A1 | 1/2013 |
| DE | 102011107007 A1 | 1/2013 |
| DE | 102011109309 A1 | 2/2013 |
| DE | 102011111537 A1 | 2/2013 |
| DE | 102011112598 A1 | 3/2013 |
| DE | 102011086049 A1 | 5/2013 |
| DE | 102011109011 A1 | 5/2013 |
| DE | 102011120010 A1 | 6/2013 |
| DE | 102012000622 A1 | 7/2013 |
| DE | 102012001596 A1 | 8/2013 |
| DE | 102012102657 A1 | 10/2013 |
| DE | 102012103149 A1 | 10/2013 |
| DE | 102013205215 A1 | 10/2013 |
| DE | 102013205323 A1 | 10/2013 |
| DE | 202013104224 U1 | 10/2013 |
| DE | 102012012897 A1 | 1/2014 |
| DE | 102012107548 A1 | 2/2014 |
| DE | 102012219301 A1 | 2/2014 |
| DE | 202012104339 U1 | 2/2014 |
| DE | 102012018057 A1 | 3/2014 |
| DE | 102013200562 A1 | 7/2014 |
| DE | 102013200726 A1 | 7/2014 |
| DE | 102013200786 A1 | 7/2014 |
| DE | 102013203102 A1 | 8/2014 |
| DE | 102013102501 A1 | 9/2014 |
| DE | 102013208996 A1 | 11/2014 |
| DE | 102013215082 A1 | 2/2015 |
| DE | 102013218674 A1 | 3/2015 |
| DE | 102014011609 A1 | 3/2015 |
| DE | 102014217188 A1 | 3/2015 |
| DE | 102013016797 A1 | 4/2015 |
| DE | 102013223357 A1 | 5/2015 |
| DE | 102014100334 A1 | 7/2015 |
| DE | 202015005208 U1 | 8/2015 |
| DE | 102014203715 A1 | 9/2015 |
| DE | 102014106949 A1 | 11/2015 |
| DE | 202014008335 U1 | 1/2016 |
| DE | 202014008336 U1 | 1/2016 |
| DE | 102014011727 A1 | 2/2016 |
| DE | 102014215164 A1 | 2/2016 |
| DE | 102014112596 A1 | 3/2016 |
| DE | 102014219644 A1 | 3/2016 |
| DE | 102014115051 A1 | 4/2016 |
| DE | 102014221167 A1 | 4/2016 |
| DE | 102014019696 A1 | 6/2016 |
| DE | 102014224545 A1 | 6/2016 |
| DE | 102015015504 A1 | 6/2016 |
| DE | 102015014337 A1 | 7/2016 |
| DE | 102015200636 A1 | 7/2016 |
| DE | 102015204216 A1 | 9/2016 |
| DE | 202016005333 U1 | 9/2016 |
| DE | 102015219558 A1 | 4/2017 |
| DE | 102015222171 A1 | 5/2017 |
| EP | 0705724 A2 | 4/1996 |
| EP | 0779668 A1 | 6/1997 |
| EP | 0780915 A1 | 6/1997 |
| EP | 1939028 A1 | 7/2008 |
| EP | 2298690 A1 | 3/2011 |
| EP | 2374646 A2 | 10/2011 |
| EP | 2388851 A1 | 11/2011 |
| EP | 2456003 A1 | 5/2012 |
| EP | 2467276 A1 | 6/2012 |
| EP | 2554420 A1 | 2/2013 |
| EP | 2562065 A1 | 2/2013 |
| EP | 2565958 A1 | 3/2013 |
| EP | 2581249 A1 | 4/2013 |
| EP | 2620997 A1 | 7/2013 |
| EP | 2626231 A2 | 8/2013 |
| EP | 2626232 A2 | 8/2013 |
| EP | 2626233 A2 | 8/2013 |
| EP | 2741343 A1 | 6/2014 |
| EP | 2758262 B1 | 7/2014 |
| EP | 2833436 A1 | 2/2015 |
| EP | 2913863 A1 | 9/2015 |
| EP | 2944493 A1 | 11/2015 |
| EP | 2990247 A1 | 3/2016 |
| EP | 3379598 A1 | 9/2018 |
| EP | 3382774 A1 | 10/2018 |
| FR | 2661281 A1 | 10/1991 |
| FR | 2705926 A1 | 12/1994 |
| FR | 2774044 A1 | 7/1999 |
| FR | 2782399 A1 | 2/2000 |
| FR | 2861441 A1 | 4/2005 |
| FR | 2948072 A1 | 1/2011 |
| FR | 2949096 A3 | 2/2011 |
| FR | 2959454 A1 | 11/2011 |
| FR | 2961960 A1 | 12/2011 |
| FR | 2962076 A1 | 1/2012 |
| FR | 2975230 A1 | 11/2012 |
| FR | 2976731 A1 | 12/2012 |
| FR | 2982566 A1 | 5/2013 |
| FR | 2986374 A1 | 8/2013 |
| FR | 2986744 A1 | 8/2013 |
| FR | 2986910 A1 | 8/2013 |
| FR | 2986911 A1 | 8/2013 |
| FR | 2987000 A1 | 8/2013 |
| FR | 2987001 A1 | 8/2013 |
| FR | 2988039 A1 | 9/2013 |
| FR | 2990386 A1 | 11/2013 |
| FR | 2993511 A1 | 1/2014 |
| FR | 2994340 A1 | 2/2014 |
| FR | 2996193 A1 | 4/2014 |
| FR | 2998715 A1 | 5/2014 |
| FR | 2999809 A1 | 6/2014 |
| FR | 3000002 A1 | 6/2014 |
| FR | 3002910 A1 | 9/2014 |
| FR | 3007209 A1 | 12/2014 |
| FR | 3014035 A1 | 6/2015 |
| FR | 3019688 A1 | 10/2015 |
| FR | 3022402 A1 | 12/2015 |
| FR | 3028456 A1 | 5/2016 |
| GB | 2081495 A | 2/1982 |
| GB | 2353151 A | 2/2001 |
| GB | 2443272 A | 4/2008 |
| GB | 2483272 A | 3/2012 |
| GB | 2516120 A | 1/2015 |
| JP | 05193370 | 3/1993 |
| JP | H05193366 A | 8/1993 |
| JP | H05201356 A | 8/1993 |
| JP | H08268083 A | 10/1996 |
| JP | H08276752 A | 10/1996 |
| JP | H1075504 A | 3/1998 |
| JP | H10109548 A | 4/1998 |
| JP | H10149805 A | 6/1998 |
| JP | 2819927 B2 | 11/1998 |
| JP | H11178115 A | 7/1999 |
| JP | 2967711 B2 | 10/1999 |
| JP | 2000041303 A | 2/2000 |
| JP | 3085346 B2 | 9/2000 |
| JP | 3199296 B2 | 8/2001 |

(56) References Cited

FOREIGN PATENT DOCUMENTS

| | | | |
|---|---|---|---|
| JP | 3284850 B2 | 5/2002 |
| JP | 3284878 B2 | 5/2002 |
| JP | 3286634 B2 | 5/2002 |
| JP | 3489186 B2 | 1/2004 |
| JP | 2004142524 A | 5/2004 |
| JP | 2007331669 A | 12/2007 |
| JP | 2011006050 A | 1/2011 |
| JP | 2011049151 A | 3/2011 |
| JP | 2011152906 A | 8/2011 |
| JP | 2013133044 A | 7/2013 |
| KR | 20120030014 A | 3/2012 |
| KR | 20140007063 A | 1/2014 |
| KR | 101565980 B1 | 11/2015 |
| KR | 101565981 B1 | 11/2015 |
| KR | 20160001976 A | 1/2016 |
| KR | 20160055712 A | 5/2016 |
| KR | 20160087077 A | 7/2016 |
| KR | 101647825 B1 | 8/2016 |
| KR | 20160092902 A | 8/2016 |
| KR | 20160104867 A | 9/2016 |
| KR | 20160111231 A | 9/2016 |
| KR | 20160116383 A | 10/2016 |
| KR | 20170000325 A | 1/2017 |
| KR | 101704496 B1 | 2/2017 |
| KR | 20170052831 A | 5/2017 |
| KR | 20170062845 A | 6/2017 |
| KR | 20170065764 A | 6/2017 |
| KR | 20170065771 A | 6/2017 |
| KR | 20170065854 A | 6/2017 |
| KR | 20170070080 A | 6/2017 |
| KR | 1020170067240 A | 6/2017 |
| SE | 507909 C2 | 7/1998 |
| TW | 201425112 A | 7/2014 |
| TW | I467830 B | 1/2015 |
| TW | I482718 B | 5/2015 |
| WO | 0074964 A1 | 12/2000 |
| WO | 2006100005 A2 | 9/2006 |
| WO | 2006100006 A1 | 9/2006 |
| WO | 2008104356 A1 | 9/2008 |
| WO | 2008104358 A1 | 9/2008 |
| WO | 2008104376 A1 | 9/2008 |
| WO | 2008131935 A2 | 11/2008 |
| WO | 2009080151 A1 | 7/2009 |
| WO | 2009080166 A1 | 7/2009 |
| WO | 2009103462 A1 | 8/2009 |
| WO | 2010004192 A2 | 1/2010 |
| WO | 2010012337 A1 | 2/2010 |
| WO | 2010012338 A1 | 2/2010 |
| WO | 2010012342 A1 | 2/2010 |
| WO | 2010040520 A2 | 4/2010 |
| WO | 2010063365 A1 | 6/2010 |
| WO | 2010069713 A1 | 6/2010 |
| WO | 2010076053 A1 | 7/2010 |
| WO | 2010076055 A1 | 7/2010 |
| WO | 2010076452 A1 | 7/2010 |
| WO | 2011030041 A1 | 3/2011 |
| WO | 2011083980 A2 | 7/2011 |
| WO | 2011106851 A2 | 9/2011 |
| WO | 2011116801 A1 | 9/2011 |
| WO | 2011116959 A2 | 9/2011 |
| WO | 2011121757 A1 | 10/2011 |
| WO | 2011134815 A1 | 11/2011 |
| WO | 2011134828 A1 | 11/2011 |
| WO | 2012025710 A2 | 3/2012 |
| WO | 2012063025 A2 | 5/2012 |
| WO | 2012065853 A1 | 5/2012 |
| WO | 2012065855 A1 | 5/2012 |
| WO | 2012069349 A1 | 5/2012 |
| WO | 2012084132 A2 | 6/2012 |
| WO | 2012093233 A1 | 7/2012 |
| WO | 2012097514 A1 | 7/2012 |
| WO | 2012114040 A1 | 8/2012 |
| WO | 2012116608 A1 | 9/2012 |
| WO | 2012119424 A1 | 9/2012 |
| WO | 2012163504 A2 | 12/2012 |
| WO | 2013020707 A2 | 2/2013 |
| WO | 2013027982 A2 | 2/2013 |
| WO | 2013042628 A1 | 3/2013 |
| WO | 2013080008 A2 | 6/2013 |
| WO | 2013188680 A1 | 12/2013 |
| WO | 2014114511 A1 | 7/2014 |
| WO | 2014140412 A1 | 9/2014 |
| WO | 2014140463 A1 | 9/2014 |
| WO | 2014183995 A1 | 11/2014 |
| WO | 2014191651 A2 | 12/2014 |
| WO | 2015018658 A1 | 2/2015 |
| WO | 2015043869 A1 | 4/2015 |
| WO | 2015149660 A1 | 10/2015 |
| WO | 2016029084 A1 | 2/2016 |
| WO | 2016046144 A1 | 3/2016 |
| WO | 2016046145 A1 | 3/2016 |
| WO | 2016046146 A1 | 3/2016 |
| WO | 2016046147 A1 | 3/2016 |
| WO | 2016072822 A1 | 5/2016 |
| WO | 2016086274 A1 | 6/2016 |
| WO | 2016106658 A1 | 7/2016 |
| WO | 2016132280 A1 | 8/2016 |
| WO | 2016203130 A1 | 12/2016 |
| WO | 2017025592 A1 | 2/2017 |
| WO | 2017032571 A1 | 3/2017 |
| WO | 2017060608 A1 | 4/2017 |
| WO | 2017084938 A1 | 5/2017 |
| WO | 2017103449 A1 | 6/2017 |
| WO | 2018033880 A2 | 2/2018 |
| WO | 2018065554 A1 | 4/2018 |
| WO | 2018149762 A1 | 8/2018 |
| WO | 2018213475 A1 | 11/2018 |
| WO | 2019055658 A2 | 3/2019 |
| WO | 2019-071013 A1 | 4/2019 |

OTHER PUBLICATIONS

International Searhcing Authority, International Search Report and Written Opinion for Application No. PCT/IB2018/050066, dated Apr. 26, 2018.
Korean Intellectual Property Office (ISA), International Search Report and Written Opinion for International Application No. PCT/US2018/033009, dated Sep. 11, 2018.
Korean Intellectual Property Office (ISA), International Search Report and Written Opinion for International Application No. PCT/US2018/032760, dated Sep. 11, 2018.
Korean Intellectual Property Office (ISA), International Search Report and Written Opinion for International Application No. PCT/US2018/050889, dated Mar. 21, 2019.
Korean Intellectual Propery Office (ISA), International Search Report and Written Opinion for International Application No. PCT/US2018/054423, dated Jan. 28, 2019.
HybridCars "2017 Chevy Bolt Battery Cooling and Gearbox Details", George S. Bower and Keith Ritter, 15 pages, Jan. 18, 2016.
Chevrolet Pressroom, "Drive Unit and Battery at the Heart of Chevrolet Bolt EV, Engineers focus on careful balance of range and performance", 9 pages, Jan. 11, 2016.

* cited by examiner

COOLING SYSTEM INTEGRATED WITH VEHICLE BATTERY TRAY

CROSS-REFERENCE TO RELATED APPLICATIONS

This application is a continuation-in-part application of International Application No. PCT/US2019/019964, filed Feb. 28, 2019, which claims benefit and priority to U.S. provisional application Ser. No. 62/637,155, filed Mar. 1, 2018, which are hereby incorporated herein by reference in their entireties.

TECHNICAL FIELD

The present disclosure generally relates to vehicle battery support structures, and more particularly to cooling systems or devices for batteries stored in such trays or structures, such as for battery packs or modules or the like that power electric and hybrid-electric vehicles.

BACKGROUND

Electric and hybrid-electric vehicles are typically designed to locate and package battery modules on the vehicle in a manner that protects the batteries from damage when driving in various climates and environments. These batteries are also located and packaged to protect the batteries from different types of impacts. It is also relatively common for vehicle frames to locate batteries in a portion of the frame or sub-structure of the vehicle, such as between the axles and near the floor of the vehicle, which can distribute the weight of the batteries across the vehicle frame and establish a low center of gravity for the vehicle.

SUMMARY

The present disclosure provides a battery tray or structure for an electric vehicle, such as an all-electric or hybrid-electric vehicle, that has a tray floor structure that may be integrated with cooling features for cooling batteries contained in or supported by the battery tray or structure. The cooling features may include liquid coolant channels that may be integrally formed in enclosed portions of the battery tray, such as within the tray floor structure or perimeter wall members of the tray, so as to provide a cooling effect to battery modules contained in the tray. Such integrally formed coolant channels may remove or reduce coolant lines that would otherwise be contained within the battery containment area of the tray. The battery tray may provide one or more tray sections that may be extruded, such as with aluminum, or pultruded, such as with a resin and composite substrate, to form a cross-sectional profile that is substantially consistent in the direction of formation, such as to provide openings that may function as coolant channels for cooling the battery modules. Also, the peripheral wall members of the battery tray may include hollow areas that are similarly configured to function as coolant channels that may be connected, such as via a coupling, with coolant channels in the floor structure. Further supplemental cooling elements, such as cooling plates, may be attached to the coolant channels to direct coolant to a desired location, such as to a side portion or an internal portion of a battery module.

According to one aspect of the present disclosure, a battery support tray for a vehicle includes a tray floor structure that has an upper surface that is configured to interface with battery modules. The battery support tray also includes a plurality of cooling features that integrally extend along portions of the tray floor structure that are configured to draw heat away from the battery modules supported at the upper surface of the tray floor structure. The tray floor structure may also have a cross-sectional profile that is substantially consistent longitudinally along a length of the tray floor structure or laterally across a width of the tray floor structure, such as formed from extruding a metal, such as an aluminum alloy.

According to another aspect of the present disclosure, a battery support tray for a vehicle includes a floor structure that has a plurality of enclosed coolant channels that extend within portions of the floor structure. The coolant channels are configured to carry liquid coolant that draws heat away from batteries supported at the floor structure. A frame member may be coupled with an outer portion of the floor structure, such as along an edge of the floor structure, where the frame member may include a passage that interconnects with at least one of the enclosed coolant channels for carrying the liquid coolant. Optionally, the tray floor structure may have panel sections that each include a cross-sectional profile that is substantially consistent laterally across a width of the tray floor structure, where the panel sections may attach together and extend laterally between side reinforcement members that at least partially form a peripheral sidewall that borders a battery containment area.

According to yet another aspect of the present disclosure, a cooling system for a vehicle battery support tray includes a tray floor structure that is configured to support an array of battery modules. The battery support tray may also include a protective cover that is disposed over the tray floor to enclose a battery containment area for the battery modules. A plurality of coolant channels may be disposed within the tray floor structure that are configured to carry liquid coolant. The cooling system may also provide a heat exchanger may be arrange external to the battery containment area and a pump that is connected between the heat exchanger and the coolant channels for moving the liquid coolant as it draws heat away from battery modules disposed in the battery containment area. Optionally, the battery modules may include coolant channels that interconnect with the coolant channels disposed in the tray floor structure to further circulate the liquid coolant and draw heat away from battery modules.

These and other objects, advantages, purposes, and features of the present disclosure will become apparent upon review of the following specification in conjunction with the drawings.

DETAILED DESCRIPTION

Figure 1:
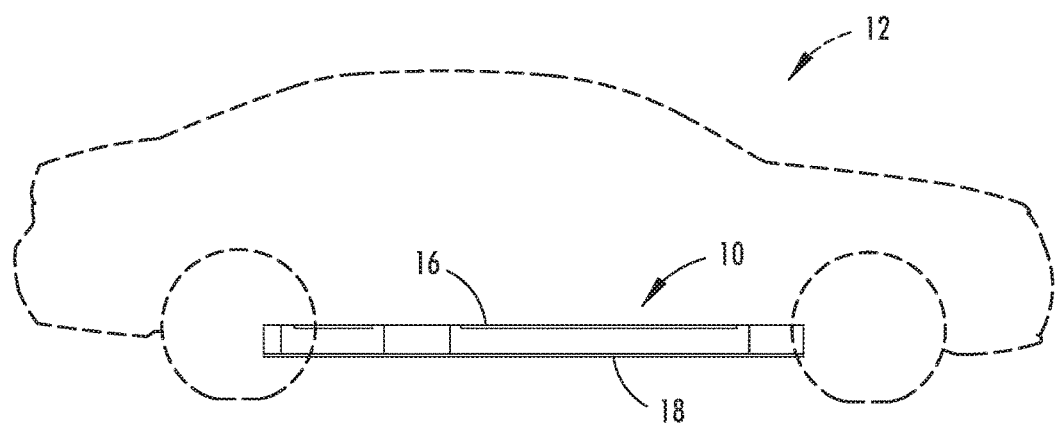
FIG. 1 is a side elevation view of a battery support tray secured at a vehicle.
Figure 8:
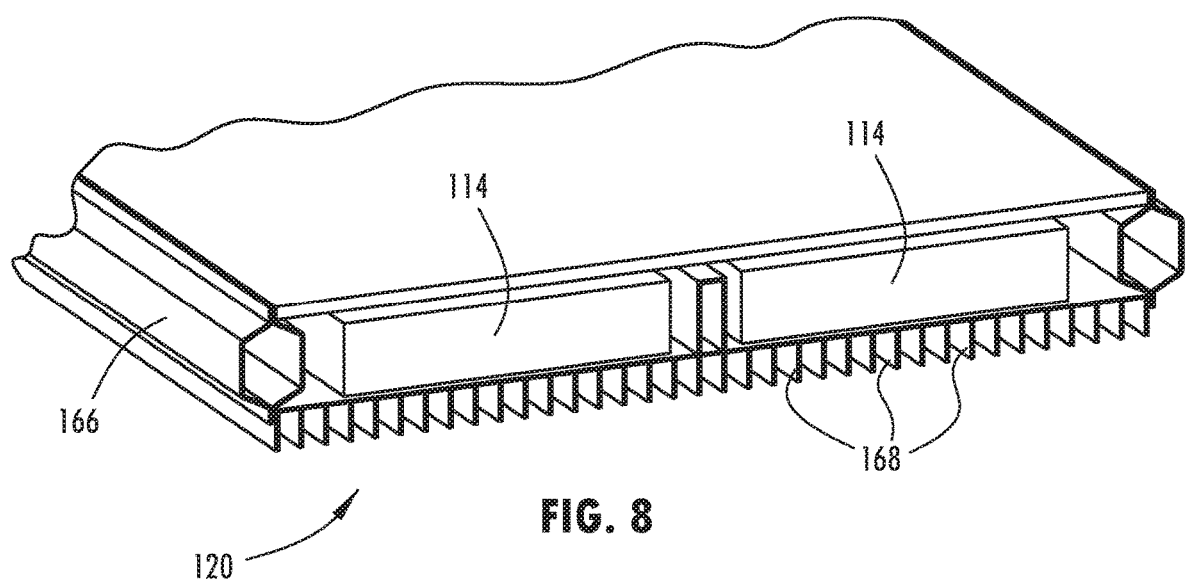
FIG. 8 is a cross-sectional upper perspective view of an additional example of a tray floor structure that attaches directly to rocker rails of a vehicle frame.
Figure 9:
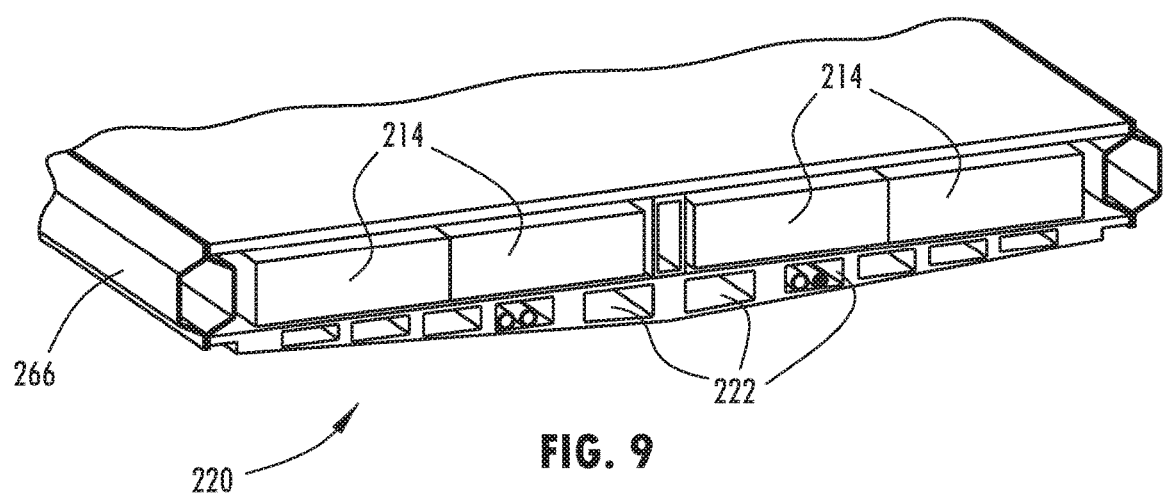
FIG. 9 is a cross-sectional upper perspective view of yet an additional example of a tray floor structure that attaches directly to rocker rails of a vehicle frame.

Referring now to the drawings and the illustrative embodiments depicted therein, a vehicle battery tray or structure 10 is provided for supporting and protecting batteries, such as battery packs or modules or the like, for an all-electric or hybrid-electric vehicle 12 (FIG. 1). The battery tray 10 may be attached or mounted at or near the lower frame or rocker rails of the vehicle frame, such as shown in FIGS. 8 and 9, so as to locate the contained battery modules 14 (FIG. 3A) generally in a central location on the vehicle 12, away from probable impact locations, and also in a location that evenly distributes the weight of the battery modules 14 and provides the vehicle with a relatively low center of gravity. The battery tray 10 may span below the vehicle 12, such as shown in FIG. 1 with a generally thin profile as defined between the upper and lower surfaces 16, 18, so as to accommodate various vehicle body types and designs. It is contemplated that the battery tray 10 may be disengaged or detached from the rocker rails or other engaged portion of the vehicle frame, such as for replacing or performing maintenance on the battery module 14 or related electrical components.

The battery tray 10 includes a tray floor structure 20 that may be engineered or configured to provide integral cooling features for cooling the battery modules 14 contained in or supported by the battery tray 10. The cooling features may be integrally formed in portions of the battery tray 10, such as within the tray floor structure 20 or perimeter wall members 26, so as to provide a cooling effect to battery modules 14 contained in the tray 10. As shown in FIG. 3A, the tray floor structure 20 battery support tray 10 may include an upper surface 20a that is configured to interface with battery modules 14. The cooling features may integrally extend along portions of the tray floor structure 20 that are configured to draw or transfer heat away from the battery modules 14 supported at the upper surface 20a of the tray floor structure 20. For example, the cooling features may extend within the tray floor structure, such as the coolant channels shown in FIGS. 2-7. As another example, the cooling features may extend downward from the tray floor structure, such as the heat sink fins shown in FIG. 8. Further, the cooling features may extend upward from the tray floor structure to more effectively transfer heat downward, such as the battery cell unit dividers shown in FIG. 10, or any combination of these or other integrally formed cooling features.

The tray floor structure 20 may also have a cross-sectional profile that is substantially consistent in a direction of formation, such as along a length of the tray floor structure or laterally across a width of the tray floor structure. In doing so, the cooling features may be formed with a consistent shape along the tray floor structure, such as to have a cross-sectional profile that is substantially consistent longitudinally along a length of the tray floor structure (FIG. 9) or laterally across a width of the tray floor structure (FIGS. 2-7). The tray floor structure 20 may be formed by extruding a metal, such as an aluminum alloy. It is also contemplated that additional embodiments of a tray floor structure may be formed by pultruding various types of fibers through a resin to provide a composite-based structure. Such a pultruded tray floor structure may have openings or channels formed within and along its consistent cross-sectional shape, which may function as coolant channels, such as by providing the openings or channels with pipes or conduit liners or the like.

Figure 2:
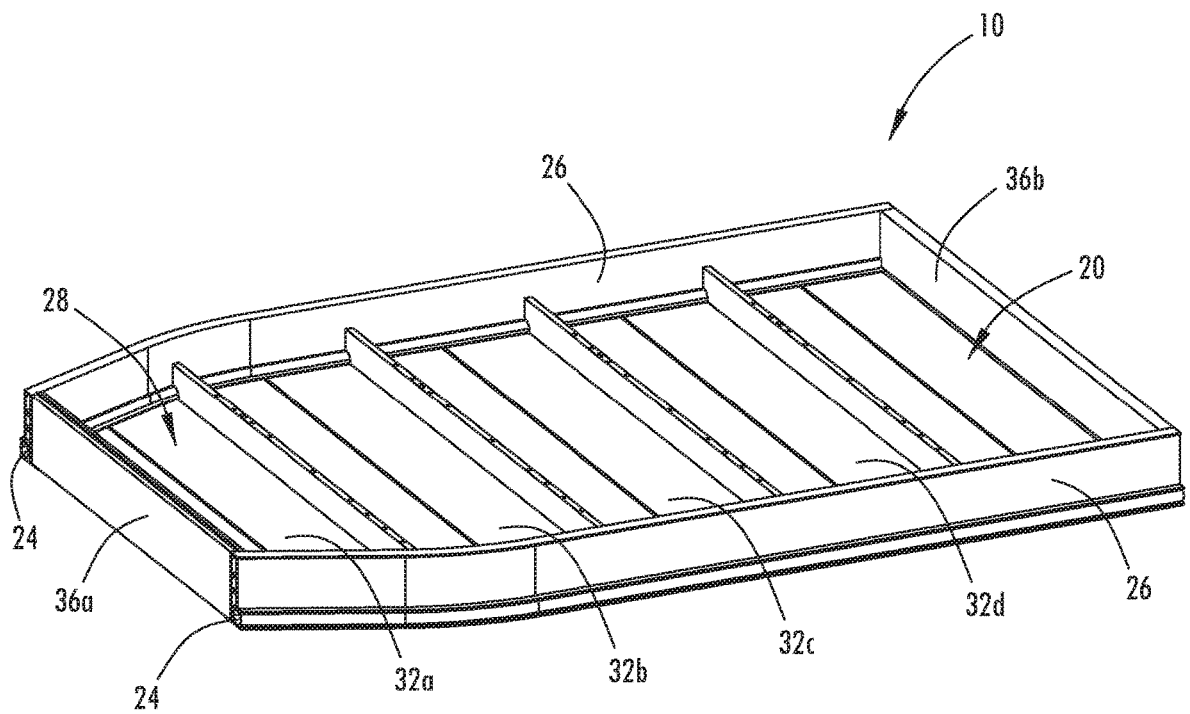
FIG. 2 is an upper perspective view of a battery support tray with a cooling system in accordance with the present disclosure.

As shown in FIGS. 2-7, the cooling features may include liquid coolant channels 22, 24 that may be integrally formed in enclosed portions of the battery tray 10, such as within the tray floor structure 20 or perimeter wall members 26, so as to transverse liquid coolant through the channels as part of a cooling circuit to provide a cooling effect to battery modules 14 contained in the tray 10. Such integrally formed coolant channels 22, 24 may remove or reduce coolant lines that may otherwise be contained within the battery containment area 28 of the battery tray 10 to provide liquid cooling. As shown in FIG. 2, the battery containment area 28 of the tray 10 may be at least partially surrounded or bordered by a side reinforcement member or peripheral frame member 26 that may be coupled with an outer portion of the floor structure 20, such as along a lateral edge of the floor structure 20. The peripheral frame member 26 may also include coolant passages or channels 24 that interconnects with at least one of the enclosed coolant channels 22 of the floor structure 20 for transferring the liquid coolant through the portions of the battery tray 10 desired to be cooled.

Figure 2A:
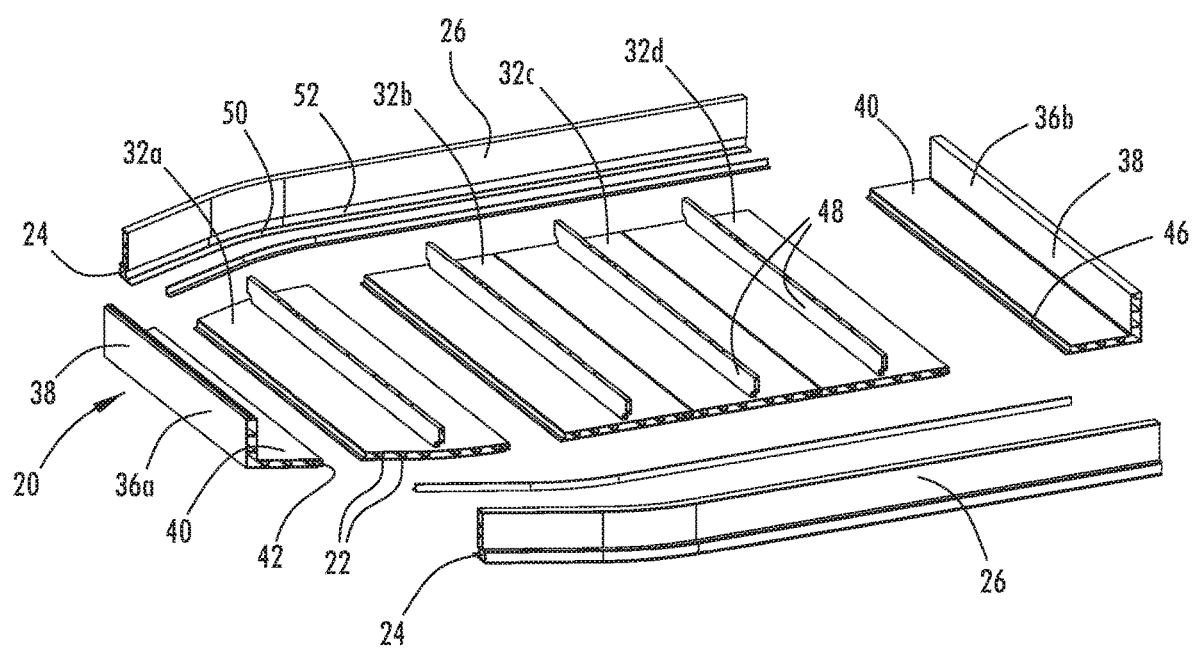
FIG. 2A is an exploded perspective view of the battery support tray shown in FIG. 2.
Figure 3:
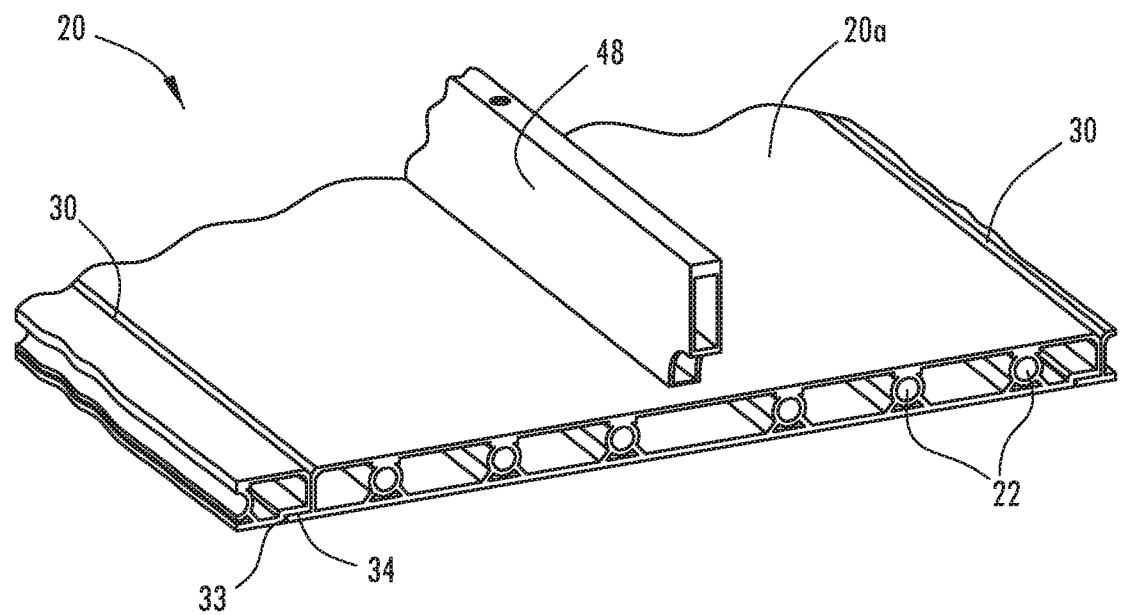
FIG. 3 is an enlarged upper perspective view of a lateral end portion of the floor structure shown in FIG. 2A, showing interlocking seams between panel sections.
Figure 3A:
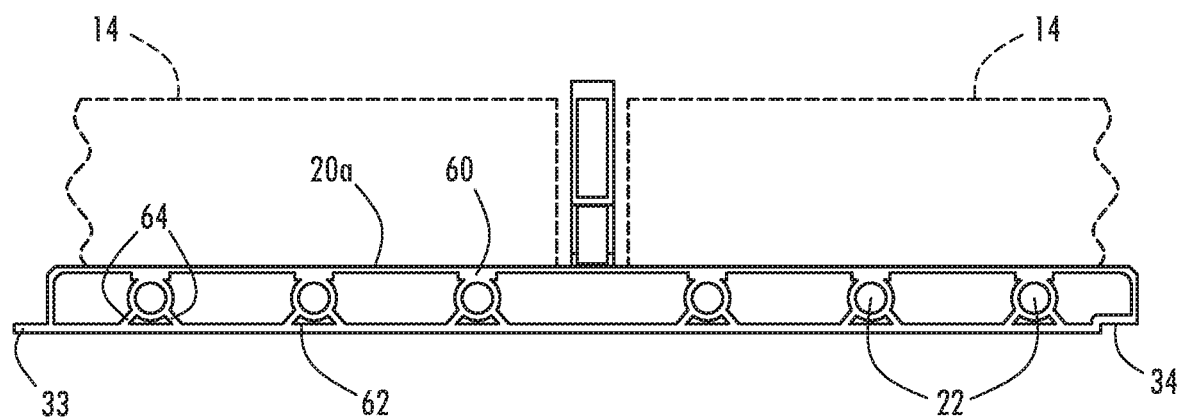
FIG. 3A is an end elevation view of a panel section shown in FIG. 3.

The battery tray 10 may provide one or more sections that may be extruded, such as with aluminum, or pultruded, such as with a resin and composite substrate, to form a cross-sectional profile that is substantially consistent in the direction of formation. As illustrated in FIG. 2A, the tray floor structure 20 may have panel sections 32a, 32b, 32c, 32d that each include the same or similar cross-sectional profile that is taken transverse to the direction of formation and that is substantially consistent laterally across a width of the tray floor structure 20. The illustrated panel sections may attach together at seams, such as via welding, where the seams may also extend laterally across the width of the tray floor structure 20. As shown in FIG. 3, the seams 30 may be an overlapping or interlocking connection, such as to assist in welding or attaching in a manner that provides a water-tight seal. The illustrated seam overlap has a flange 33 that protrudes from a lower edge area of the panel section and an upward protruding recess 34 at the lower edge area of the adjacent panel section, such that the flange 33 is configured to mate with the recess 34. The illustrated overlapping arrangement may be reversed in additional embodiments with the flange and recess at upper edge areas of the panels or may be an alternative configuration of overlapping or interlocking features.

The floor panel structure 20 may also include front and rear end panel sections 36a, 36b, such as shown in FIG. 2A to provide enclosed ends to the battery containment area 28. These end panel sections 36a, 36b may have a wall portion 38 that attaches with the side reinforcement members 26 to further form a sealed peripheral sidewall. Also, the end panel sections 36a, 36b may have a base portion 40 that attaches with the corresponding base portion of the adjacent panel section, such as to generally align the upper surfaces across the seams of the adjacent panel sections. Thus, the end panel sections 36a, 36b may form an overlapping or interlocking connection with the forward and rearward most interior panel sections 32a, 32d. The front end panel section 36a has a recess 44 at the lower edge area of the base portion to interface and mate with the flange 33 that protrudes forward from a lower edge area of the panel section 32a. Similarly, the rear end panel section 36b has a flange 46 at the lower edge area of the base portion to interface and mate with the recess 34 that protrudes upward at a lower edge area of the panel section 32d.

Figure 5:
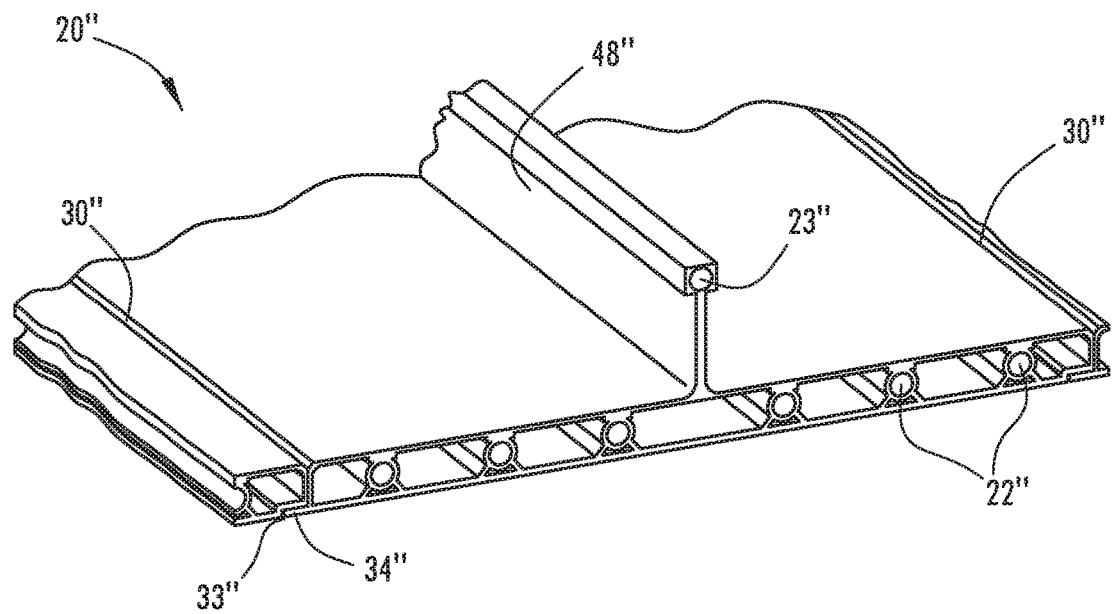
FIG. 5 is an upper perspective view of a lateral end portion of an additional example of a floor structure that shows a coolant channel disposed in a cross member.
Figure 5A:
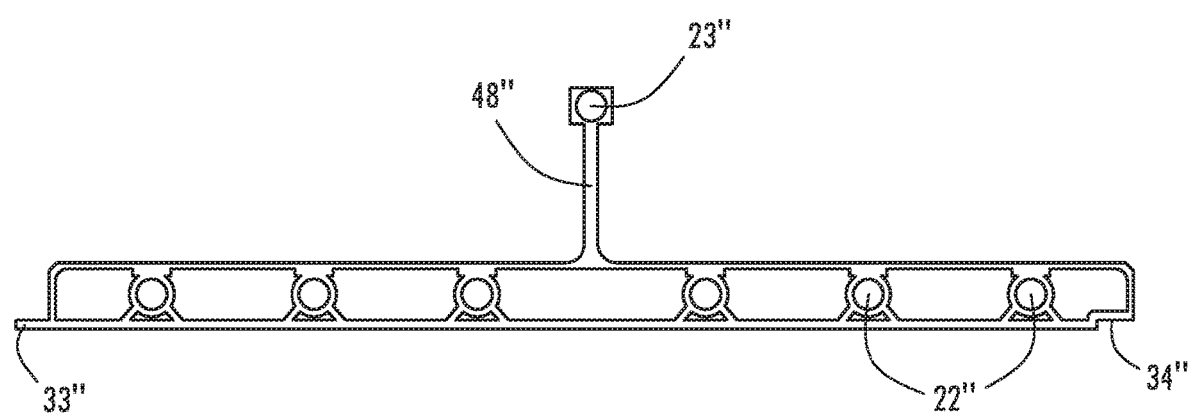
FIG. 5A is an end elevation view of a panel section shown in FIG. 5.
Figure 6:
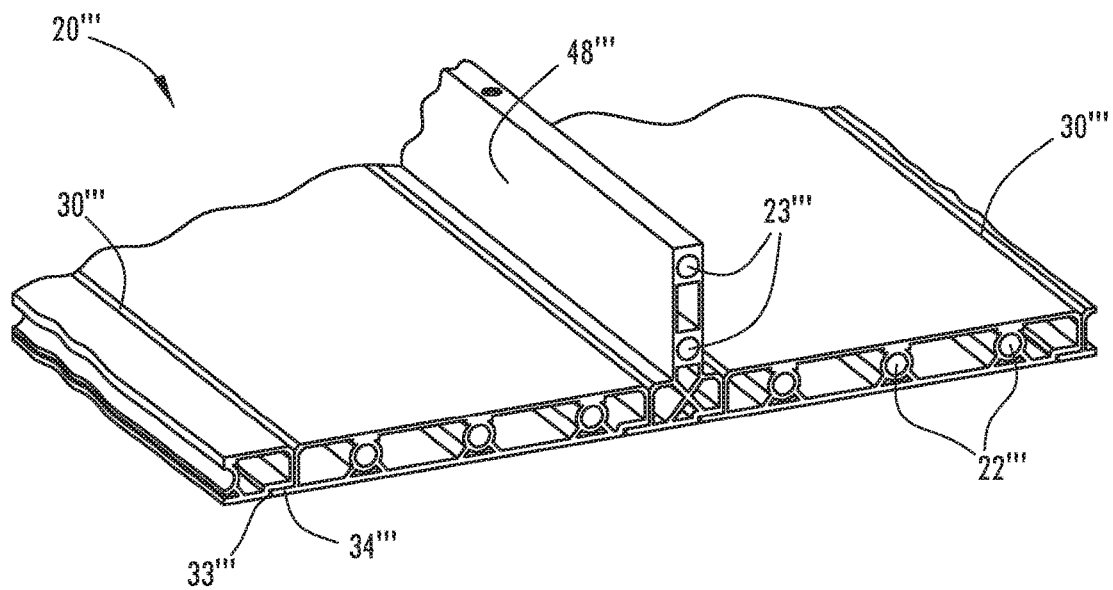
FIG. 6 is an upper perspective view of a lateral end portion of a further example of a floor structure that shows coolant channels disposed in a cross member.
Figure 6A:
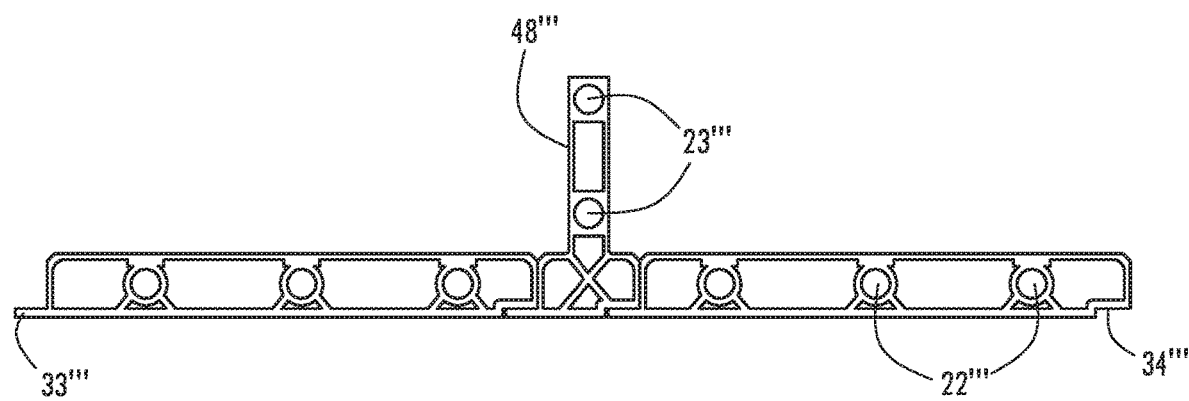
FIG. 6A is an end elevation view of panel section shown in FIG. 6.

The panel sections, such as further shown in FIG. 2A, may each have a cross member 48 portion that integrally extends upward from the base portion of the panel section. The cross member portions 48 extend laterally between and engage interior surfaces of the side reinforcement members 26, such as via welding, adhesive, and/or fasteners. The structure of the cross member portion 48 may stiffen the base portion of the panel for supporting the battery weight, may provide cross-car load transfer paths for lateral impacts and the like, and may serve as a contamination barrier between sections of the battery containment area, among other potential purpose. Accordingly, the shape and thickness of the cross member portions 48 of the panels may be configured for the desire characteristics, such as based on the battery module layout, tray design, and design of the base portion of the floor structure. To provide further distribution of liquid coolant near and around the battery modules, the cross member portions 48" of the panel sections may also provide one or more integral coolant channels 23", such as shown at an upper edge area of the cross member portions 48" in FIGS. 5 and 5A. As also shown in FIGS. 6 and 6A, the panel sections with integrated cross members 48'" may be situated between panel sections without cross members. The integrated cross member 48'" shown in FIGS. 6 and 6A has integrated coolant channels 23 in the cross member portion.

Figure 4:
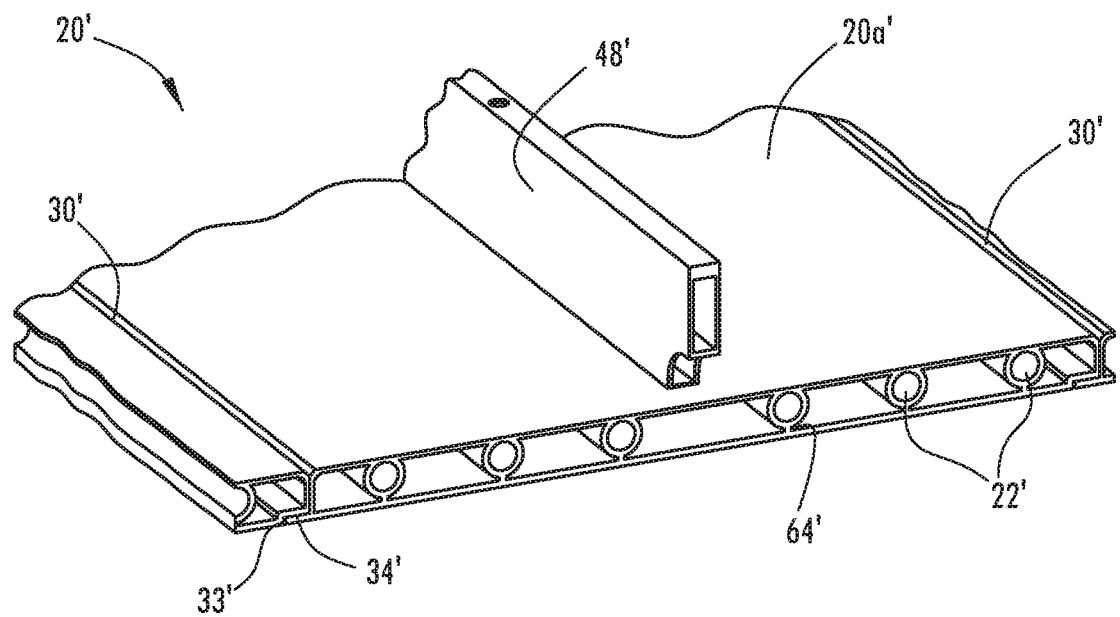
FIG. 4 is an upper perspective view of a lateral end portion of an additional example of a floor structure that shows an alternative coolant channel arrangement.

The panel sections may attach between the peripheral frame members 30, such as shown in FIG. 2A, where the panel that at least partially form a peripheral sidewall that borders the battery containment area 28. It is understood that the attachment of the panel sections to each other and to the side reinforcement members may be done by various forms of welding, adhesive, fasteners, or the like or combinations thereof to provide a stable and sealed attachment interface. Also, as shown in FIG. 2A, a sealing member may be disposed about the upper portion of the seam between the peripheral frame members 30 and the base portion of the panel sections 32a, 32b, 32c, 32d. To accommodate space for this sealing member, the cross-member portions may each include a notch at the interface of the cross-member portion and the base portion of the panel sections, such as shown in FIGS. 3 and 4. The peripheral frame member in additional embodiments may, however, include various cross-sectional profile shapes, thicknesses, hollow area configurations and the like.

Figure 7:
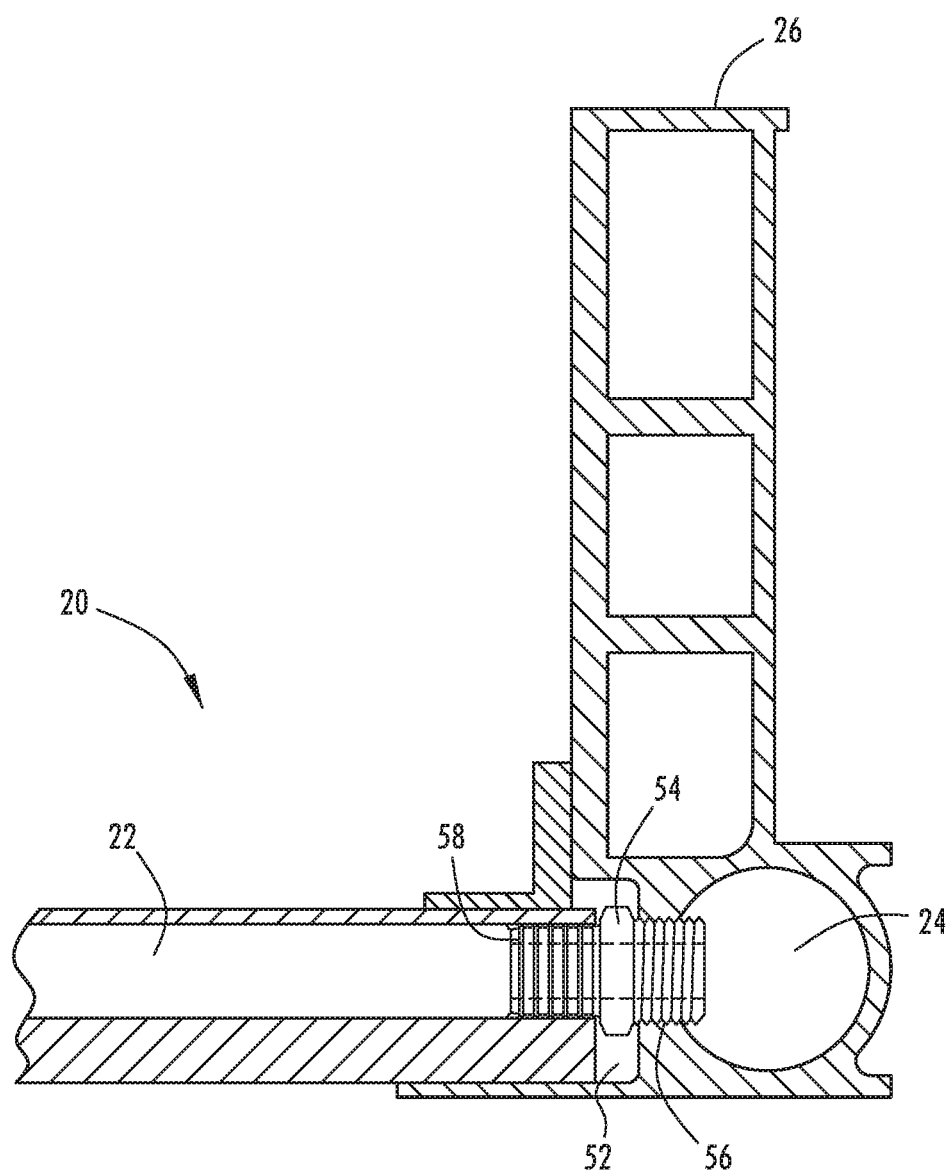
FIG. 7 is a cross-sectional view of a fluid coupling interface between a frame member and a floor panel of the tray floor structure shown in FIG. 2.

With further reference to FIG. 2A, the peripheral frame member 26 may include a flange 50 at the lower edge area that engages and supports the lower lateral edges of the floor panel structure 20. The lower edge area of the peripheral frame member 30 may also include a lateral indentation 52 along the frame member for matably receiving the lateral edges of the floor panel structure 20. As shown in FIG. 7, the area provided at the lateral indention 52 also provides space for couplings or fittings 54 to engage between the coolant channels 22 in the floor structure and the coolant passages or channels 24 that extend longitudinally along the peripheral frame member 26. The couplings or fittings may be threaded, press-fit, adhered, or welded attachments or combinations thereof, such as the illustrated fitting 54 that has a threaded engagement 56 with the peripheral frame member 26 and a connection formed at the floor structure by expandable sealant adhesive 58 that may expand from the application of heat, such as heat generated by welding the floor structure 20 to the frame member 26. It is also understood that the passages or channels, such as the channel 24 extending along the peripheral frame member 26 may be integral channels that do not require any liners or inserts to function as a flow channel or may house an inserted tube or pipe or other conduit piece, such as a conduit made of rubber or plastic, which may be less susceptible to damage than relying entirely on the integrated channels.

Figure 4A:
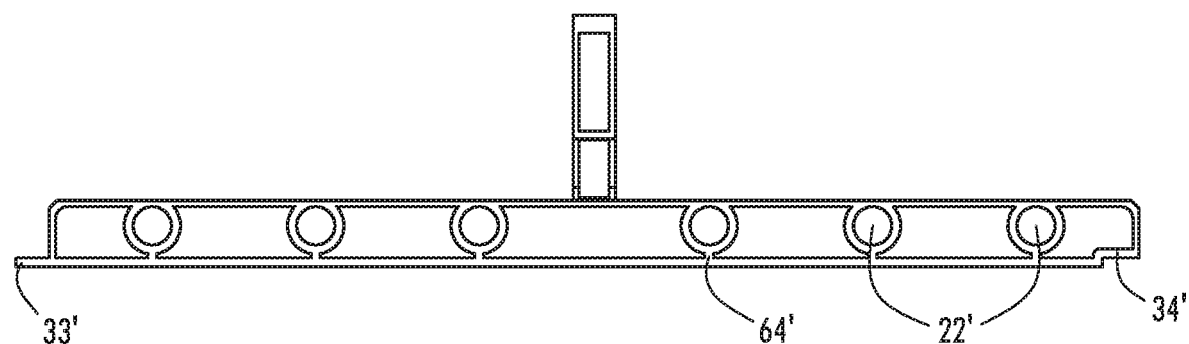
FIG. 4A is an end elevation view of a panel section shown in FIG. 4.

The coolant channels 22 formed in the floor structure 20 may be formed in various shapes and arrangements to provide the channels at the desired locations for efficiently distributing the coolant to effectuate heat transfer from the battery modules. For example, as shown in FIGS. 3 and 3A, the channels 22 are located at a vertically offset position that is closer to the upper surface 20a of the floor structure than the lower surface. Further, a mass of conductive material 60 is disposed between directly between the coolant channel and the upper surface, while an air gap 62 is disposed directly between the coolant channel 22 and the lower surface of the floor structure. The air gap 62 is formed by opposing support legs 64 that extend diagonally between the coolant channel 22 and a lower panel section of floor structure. As another example, as shown in FIGS. 4 and 4A, the coolant channels 22' are similarly disposed at a vertically offset position that is closer to the upper surface 20a' of the floor structure than the lower surface. The material surrounding the coolant channels 22' in FIGS. 4 and 4A is integrated with an upper panel section of the floor structure, while a spacer piece or leg 64' is provided between the material surrounding the coolant channels and the lower panel section. Thus, there may be more conductive material provided between the coolant channel and the upper surface that supports the battery modules and the lower surface of the floor structure.

Referring now to FIGS. 8 and 9, the tray floor structure may be mounted directly to the frame or rocker rails 166, 266. This, the supportive structure of the tray and the cooling features of the tray may be integrated with the floor structure, so as to illuminate peripheral frame members of the tray. The cooling features may integrated into the tray floor structure, for example as shown in FIG. 8 by providing downward protruding fins 168. These fins 168 can act provide heat dissipation from the batteries 114 similar to a heat sink, such as aided by air flow under the vehicle from movement of the vehicle. Also, the fins 168 can provide longitudinal stiffness to the floor structure 120, such as to otherwise reduce or eliminate demands on an outer frame structure. It is understood that the fins 168 may also or alternatively be oriented in a lateral direction relative to the vehicle and may be alternatively shaped and structured to increase surface area for airflow contact. Further, it is contemplated that structural and heat dissipating fins may be incorporated into the other illustrated floor structures disclosed herein and other various floor structures within the scope of the present disclosure.

Another example of a tray floor structure mounted directly to the frame or rocker rails 266 is shown in FIG. 9, which also illustrates longitudinally disposed coolant channels 222 integrally extending along the tray floor structure 220. The coolant channels 222 that are shown in FIG. 9 are provided with separate coolant lines, such as pipes or tubes, that are disposed within some of the coolant channels 222 to transfer the coolant longitudinally along the tray, such as to allow vertically oriented openings in the upper surface of the floor tray structure 220 to access the coolant lines, such as for cooling an individual battery module or set of modules.

Figure 10:
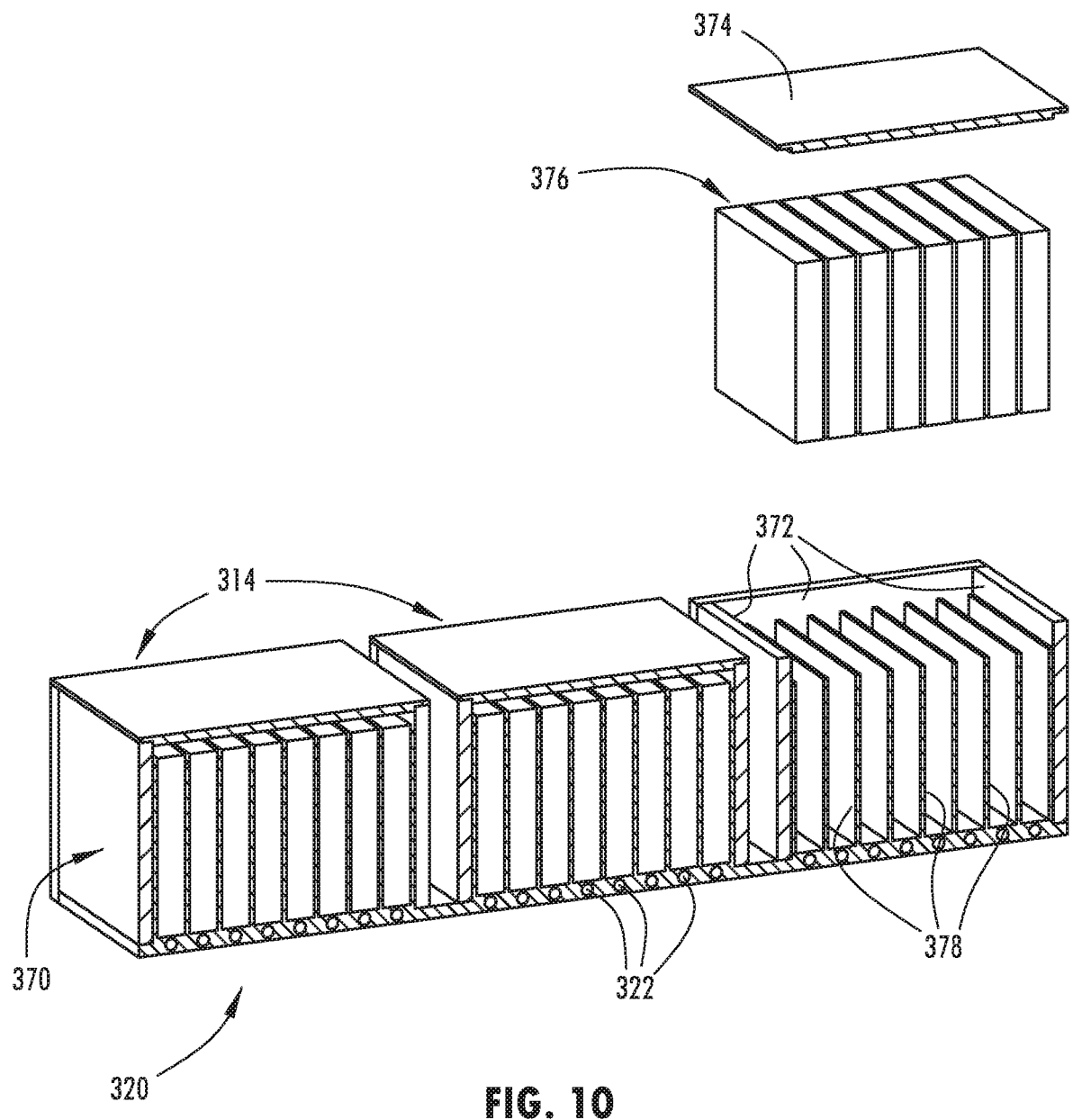
FIG. 10 is a cross-sectional upper perspective view of an additional example of a tray floor structure that shows battery cell dividers extending upward into battery modules from the tray floor structure.
Figure 11:
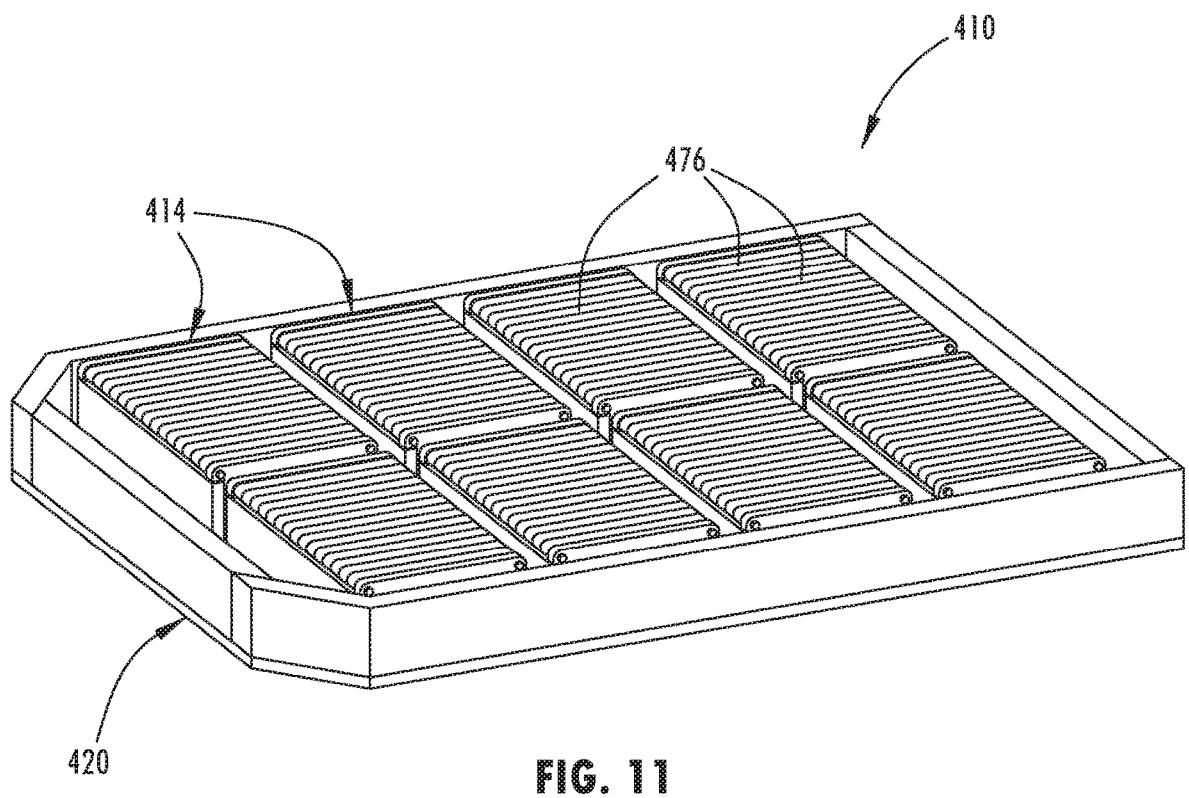
FIG. 11 is an upper perspective view of a further example of a battery support tray having an array of battery modules disposed within the battery containment area.
Figure 11A:
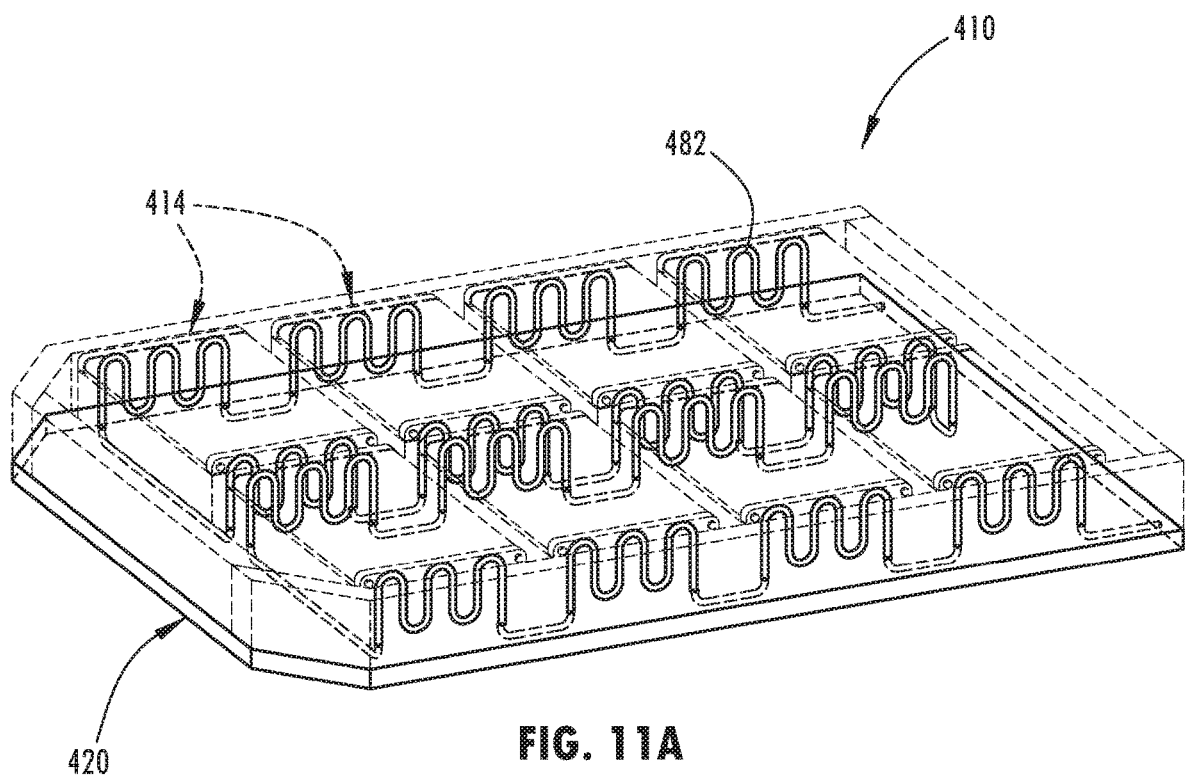
FIG. 11A is an upper perspective view of the battery support tray shown in FIG. 11 with the battery modules and tray structure shown in phantom lines to show coolant channels.

A shown in FIG. 10, the tray floor structure 320 may also or alternatively be integrated with the structure of the battery modules 314. The battery modules 314 illustrated in FIG. 10 include an outer housing 370 that has four walls 372 attached to the upper surface of the tray floor structure 320 and a cover 374 attached around the upper edges of the walls to enclose an array of battery cell units 376, such as pouches or the like. The tray floor structure includes dividers 378 that integrally protrude upward from the upper surface of the tray floor within the module area surrounded by the housing walls 372 and cover 374. The dividers 378 may interface with vertical surfaces of the battery cell units 376 so as to dissipate or transfer heat downward from the battery cell units into the tray floor structure, which may have integrated coolant channels 322, as shown in FIG. 10.

Figure 12:
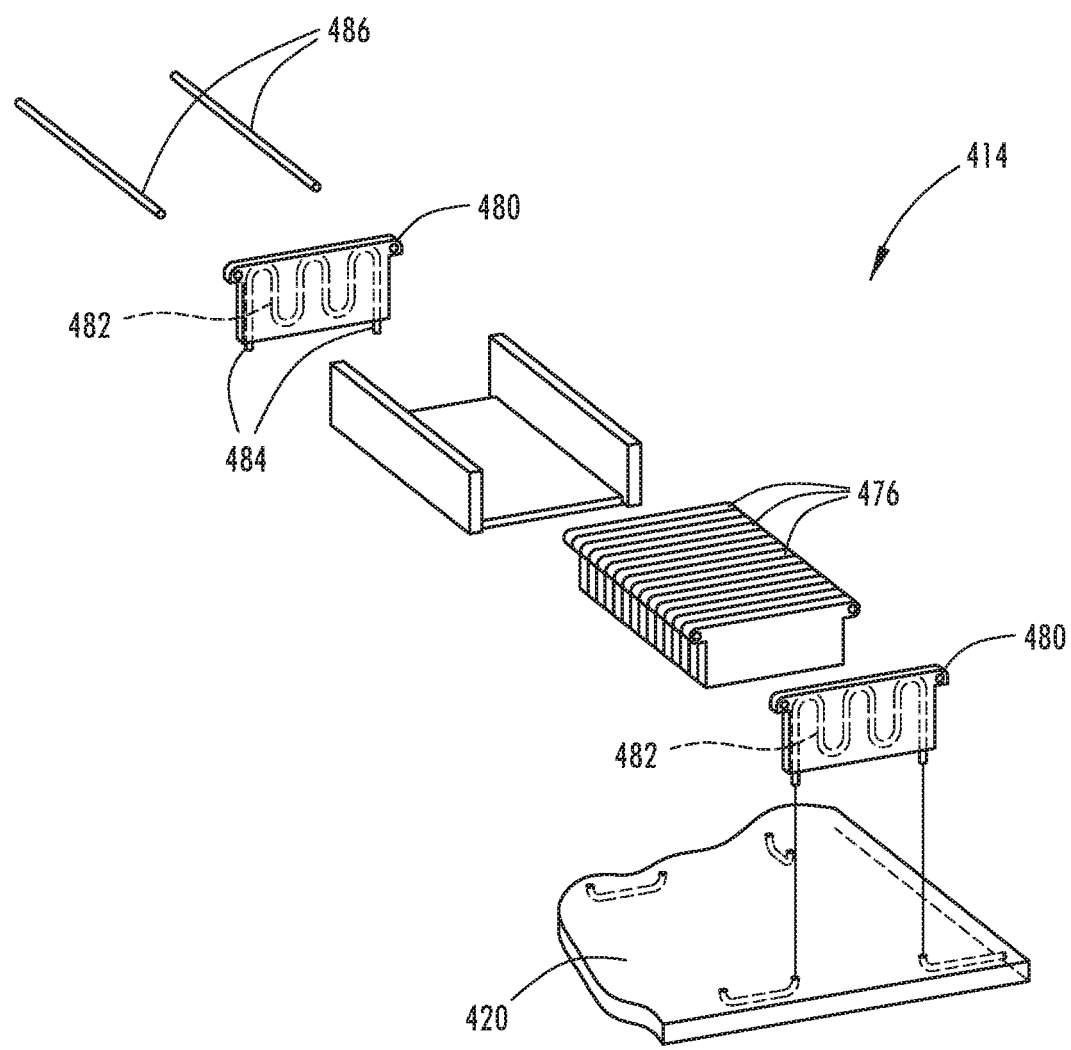
FIG. 12 is an exploded upper perspective view of a battery module shown in FIG. 10, showing coolant channels in the tray floor structure and the module end castings.
Figure 13:
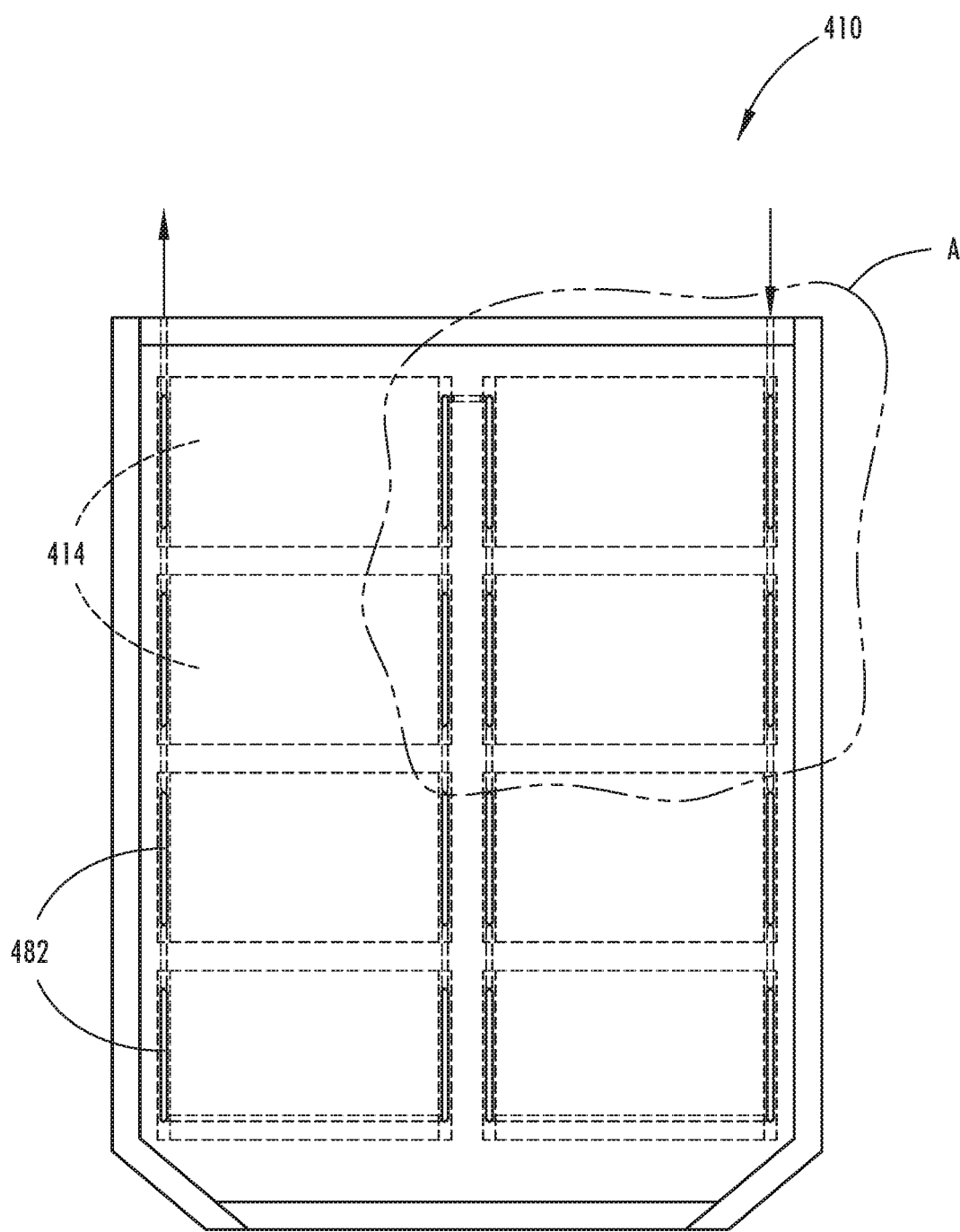
FIG. 13 is a top plan view of the battery support tray shown in FIG. 11A.
Figure 13A:
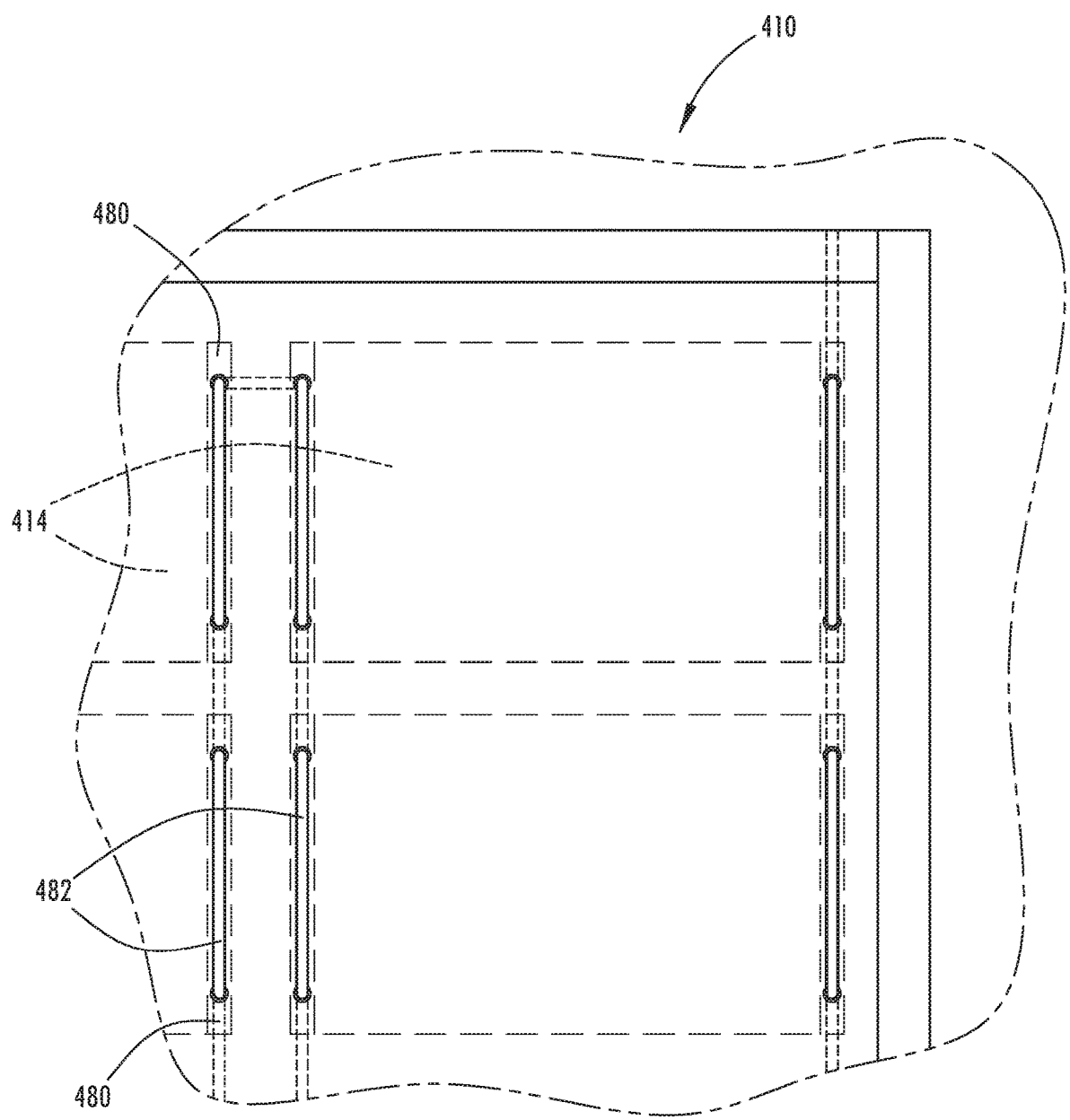
FIG. 13A is an enlarged view of the section denoted as section A on the battery support tray shown in FIG. 13.

Further supplemental cooling elements, such as additional cooling lines or cooling plates, may be attached to the coolant channels formed into the floor structure to direct the coolant to a desired location, such as at an additional surface of a battery module. With reference to FIGS. 11-13A, the battery modules 414 may include end castings 480 that may be configured with an integral coolant channel 482, whereby the end castings 480 may each have couplings that engage the coolant channels in the floor structure. As shown in FIG. 12, the end casting 480 may have downward extending protrusions 484 that engage openings or ports extending through the upper surface of the floor structure 420 to interconnect with the coolant channels. The illustrated end castings 480 may be arranged as opposing walls of the battery module 414, whereby support rods 486 may extend between the end castings 480 to engage a series of vertically oriented battery cell units 476. The end castings may be drawn toward each other to hold the battery cell units together, such as by threadably tightening the rods and the rod interface with the end castings. The coolant channels extending with the end castings may connect with the coolant channels in the floor structure so that the coolant flows through the each end casting in series, such as shown in FIGS. 13 and 13A. It is contemplated that the coolant flow in additional embodiments may be differently arranged from that shown in FIG. 13, such as with different oriented flow channels disposed in the floor structure.

Figure 14:
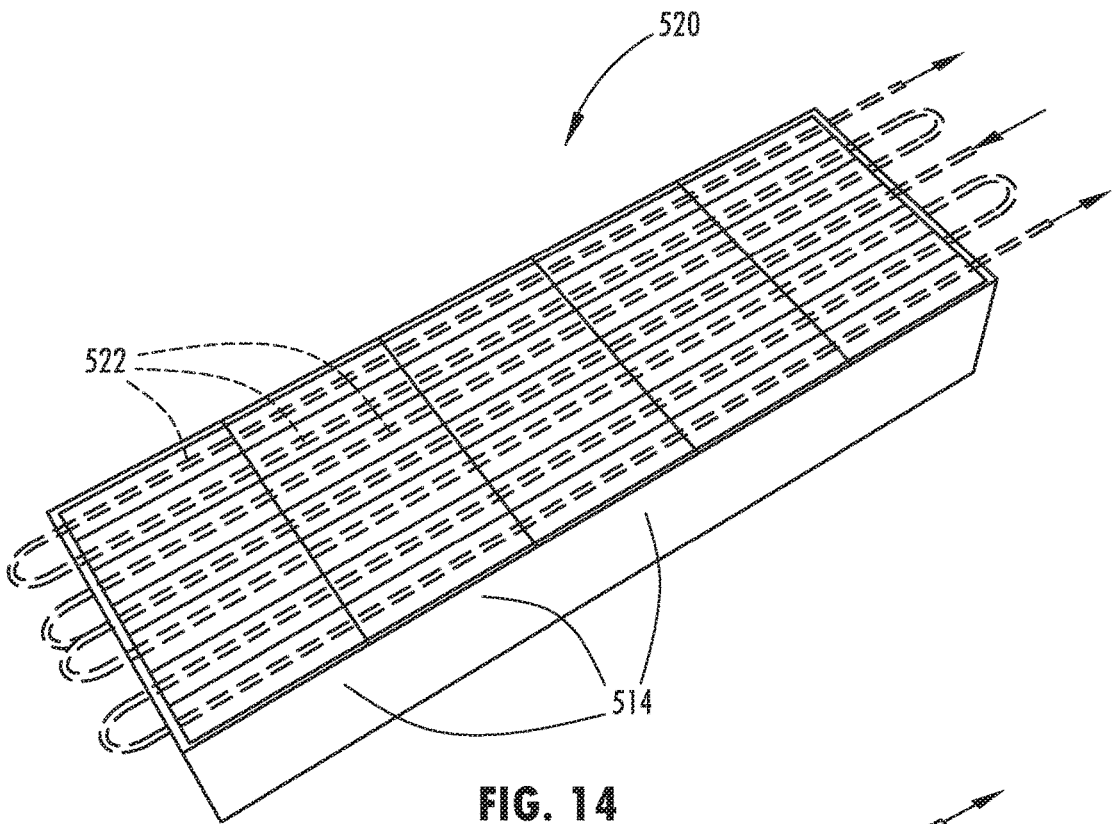
FIG. 14 is a bottom perspective view of an additional example of a battery support tray that has coolant channels and an illustrated direction of coolant follow.
Figure 14A:
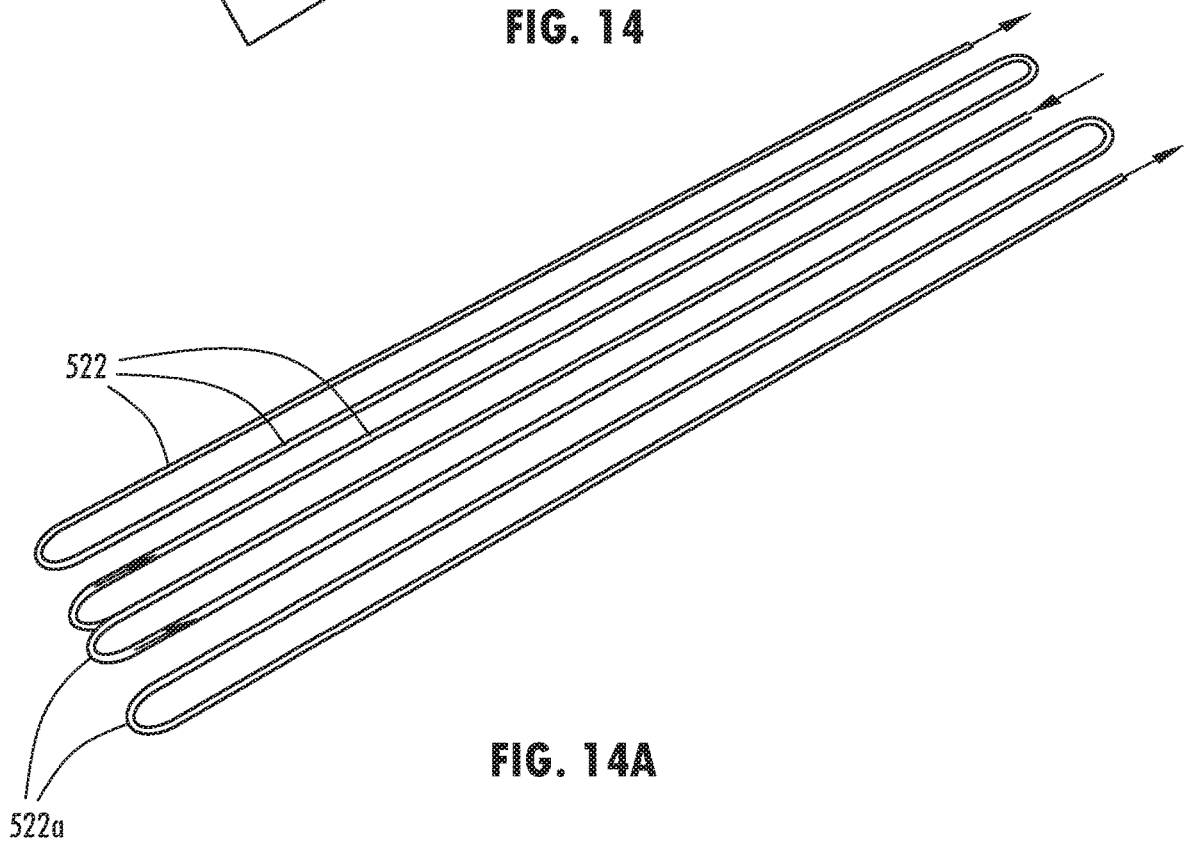
FIG. 14A is a perspective view of the direction of coolant follow shown in FIG. 14.
Figure 15:
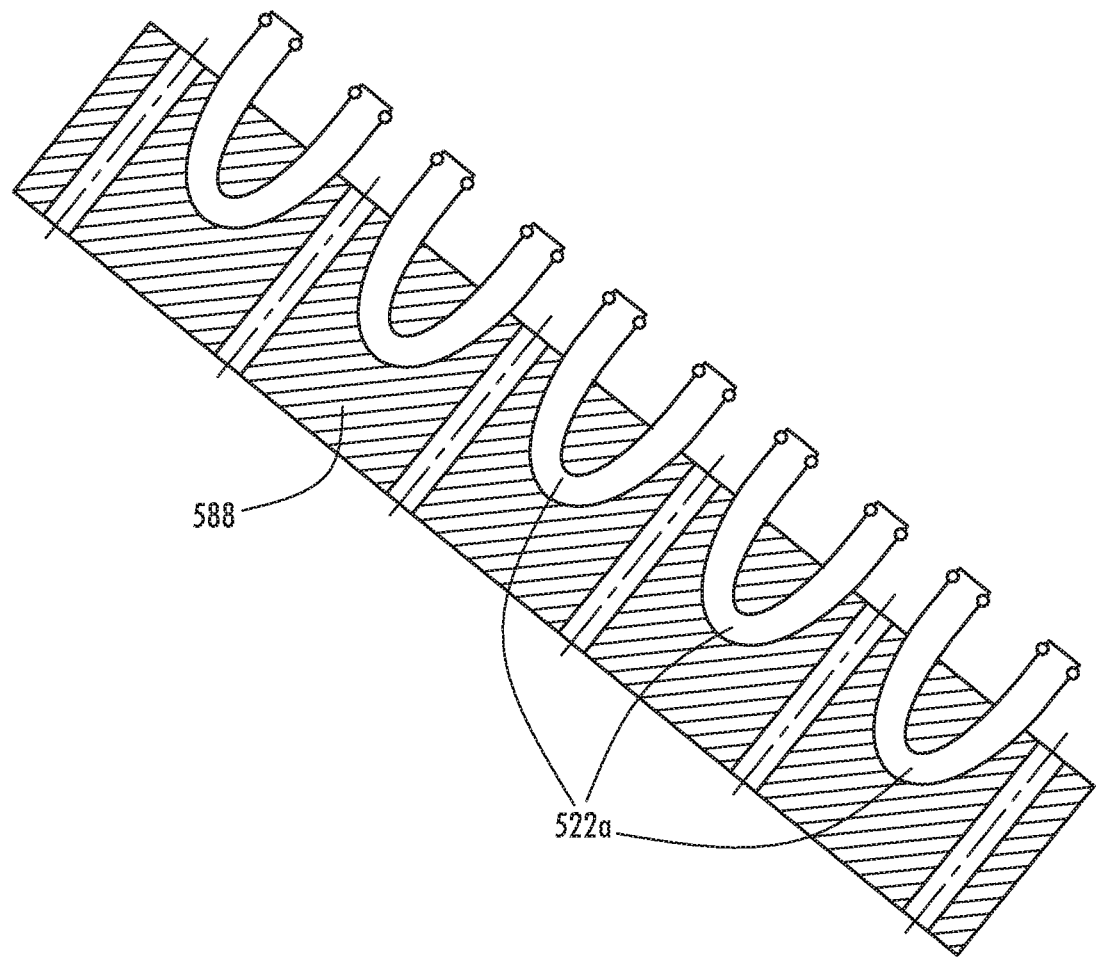
FIG. 15 is a cross-sectional view of an end cap that attaches to the floor structure of the battery support tray shown in FIG. 14.

As shown in FIGS. 14 and 14A an additional embodiment shows a coolant flowing into the tray floor structure 520 at a centrally located inlet and dissipating laterally outward through a series of serpentine channels 522 that lead to outlets disposed at or near the laterally outermost portion of the tray floor structure, such as that portion that attaches with the tray peripheral walls or the vehicle frame rails. The curved ends 522a of the serpentine channels may be provided by an end cap 588, such as shown in FIG. 15, that have curved coolant channels and through holes for connecting the end cap 588 to the floor, in a manner that aligns the openings of curved channels 522a in the end cap with the channels in the floor, which may be extruded to provide linear coolant channels. Such an end cap 588 arranged, as shown in FIG. 14, may be utilized for various embodiments or portions of the battery tray, such as ends of the tray floor structure and plate coolers. Battery cells may heat up relatively uniformly from their core, whereby battery packs or modules may subsequently heat up from their center, such that the temperature profile may fall to its outer boundaries, as shown in the heat map overlaid on the lower surface of the tray floor structure shown in FIG. 14. Accordingly, the flow pattern shown in FIGS. 14 and 14A provide cooling flow that starts with cold coolant liquid or medium coming from external heat exchanges to the center of the tray and distributing outwards to increase cooling efficiency.

Figure 16:
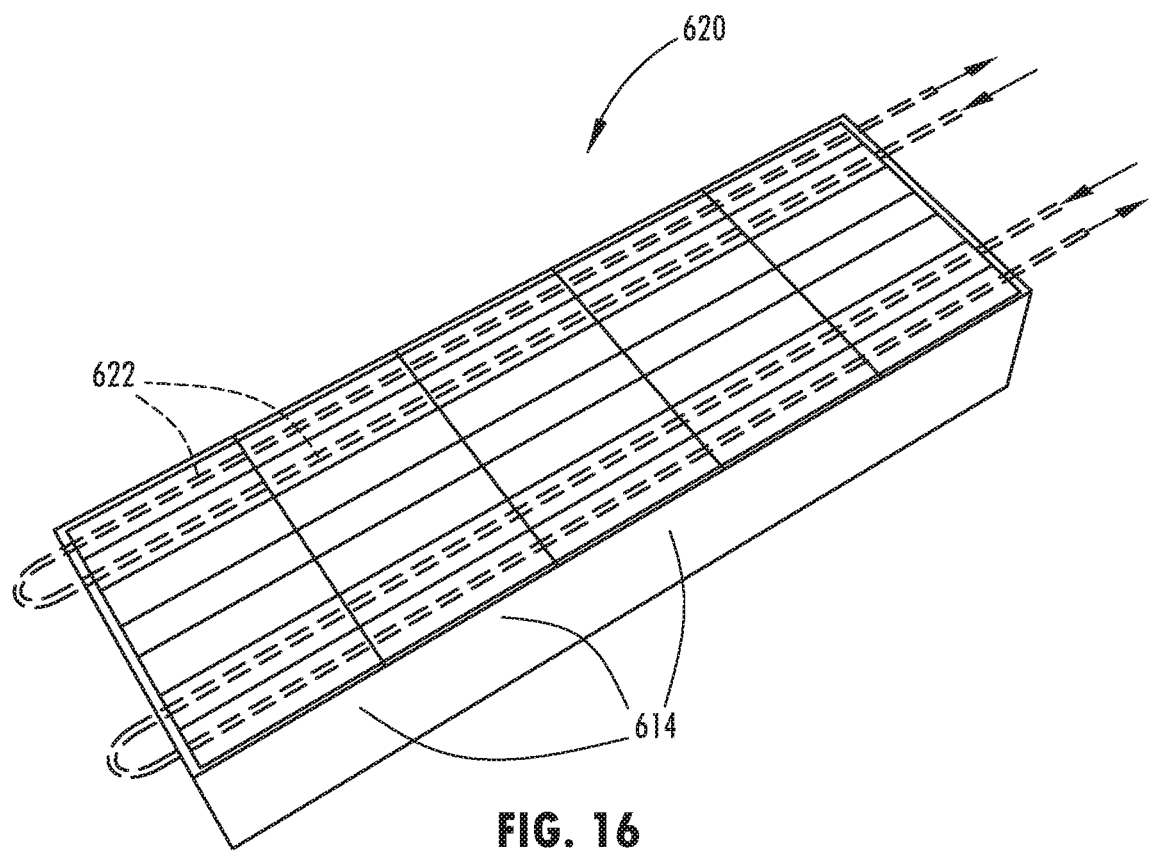
FIG. 16 is a bottom perspective view of another example of a battery support tray showing coolant channels that integrate plate coolers on battery modules.
Figure 17:
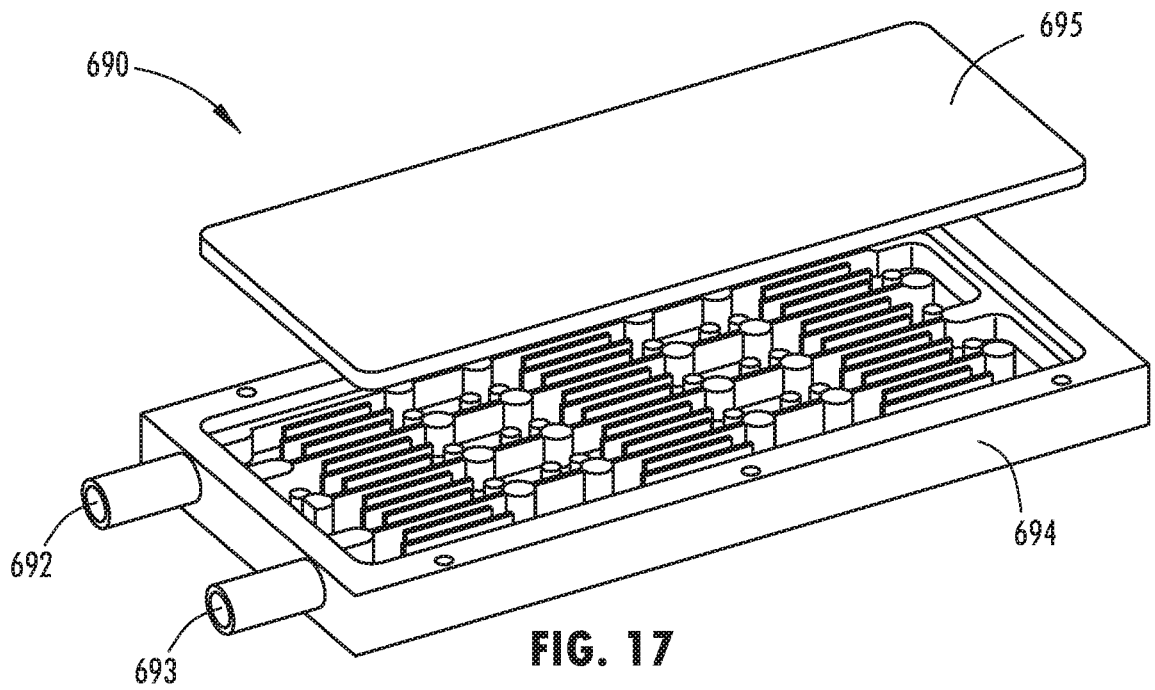
FIG. 17 is an exploded upper perspective view of a plate cooler for a battery module.
Figure 18:
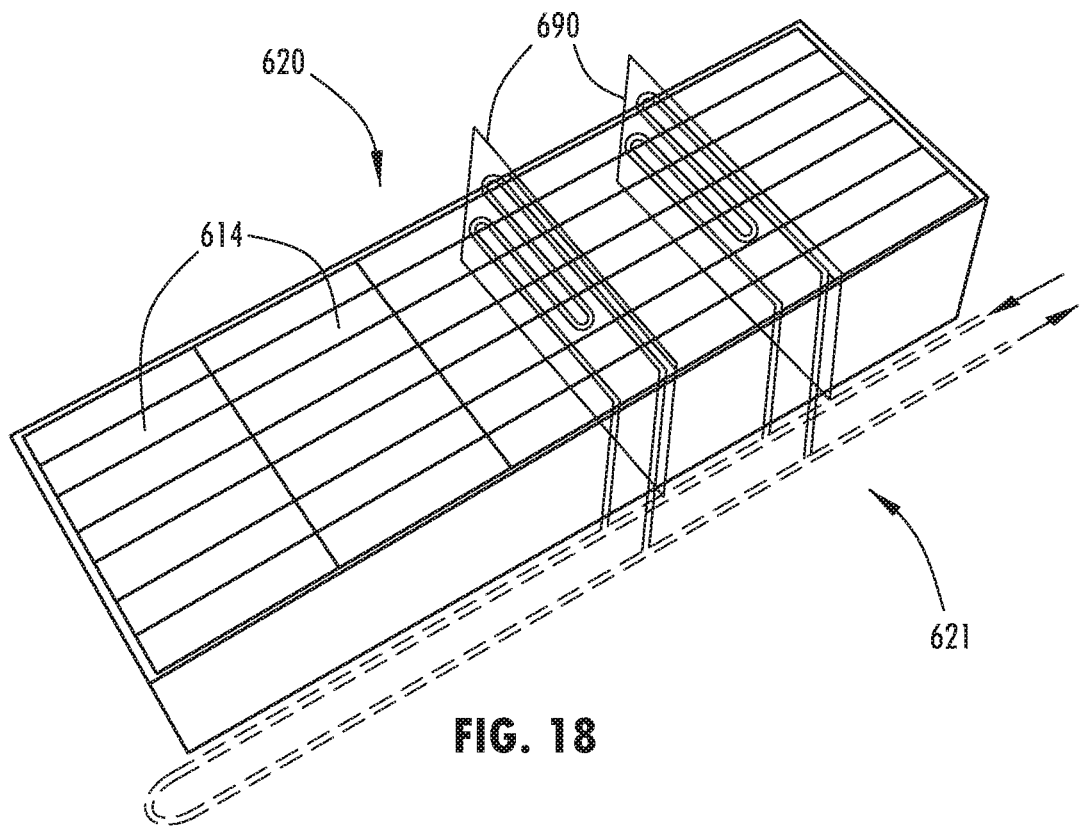
FIG. 18 is an upper perspective view of the battery support tray shown in FIG. 16, showing coolant flow paths within engaged plate coolers.
Figure 19:
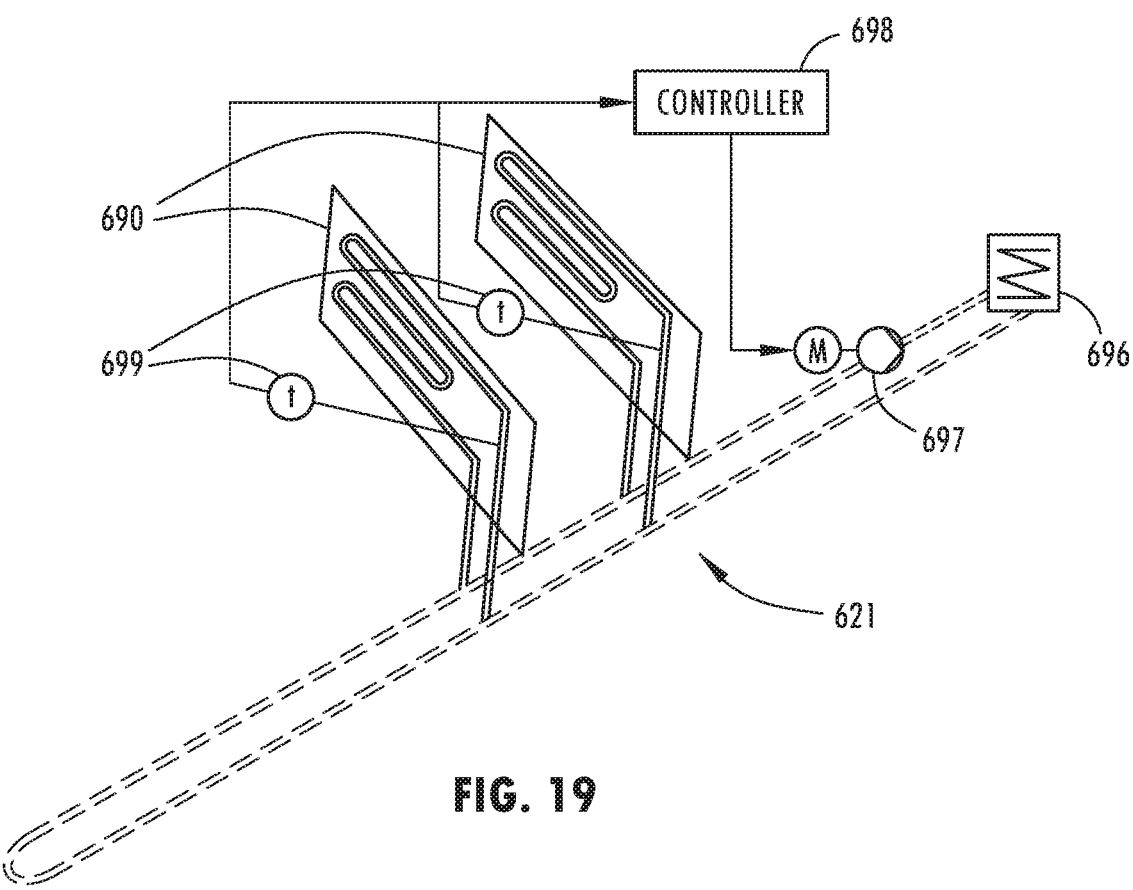
FIG. 19 is a coolant circuit diagram that corresponds with the coolant flow paths shown in FIG. 18.

The cooling provided by the coolant channels integrated into the tray floor structure may be supplemented or replaced by accessory cooling systems, such as a cooling plate system 621 shown in FIGS. 18 and 19. As shown in FIG. 17, a cooling plate 690 may have an inlet 692 and an outlet 693, such as a plug that engages a hole or port in the tray floor structure. The inlet 692 and outlet 693 lead to a body 694 or housing that has a series of flow channels so as to distribute the coolant within the body of the cooling plate. The channels within the body of the cooling plate may be machines or extruded, whereby in extrusion the interior channels can be capped off at the sides with a cover 695 or plate, as shown in FIG. 17. The inlet and out may be engaged with a separate loop of coolant channels, such as shown in FIGS. 16 and 18, whereby separate loops that engage the plate coolers are integrated on each side of the tray floor structure or battery pack. The separate loops can run through a common external heat exchanger, however they may have separate flow pumps to individually control flow rates. It is understood that the size of the cooling plate can be custom to the battery module or tray design.

As shown in FIGS. 18 and 19, the coolant channels may be disposed within the tray floor structure that are configured to carry liquid coolant. The cooling system may also provide a heat exchanger 696 may be arrange external to the battery containment area and a pump 697 that is connected between the heat exchanger 696 and the coolant channels for moving the liquid coolant as it draws heat away from the plate coolers disposed at the battery modules in the battery containment area. A controller 698 may be connected to temperature sensors 699 at the plate coolers and to the coolant pump to regulate the coolant flow for achieving the desire temperatures at the plate coolers.

Figure 20:
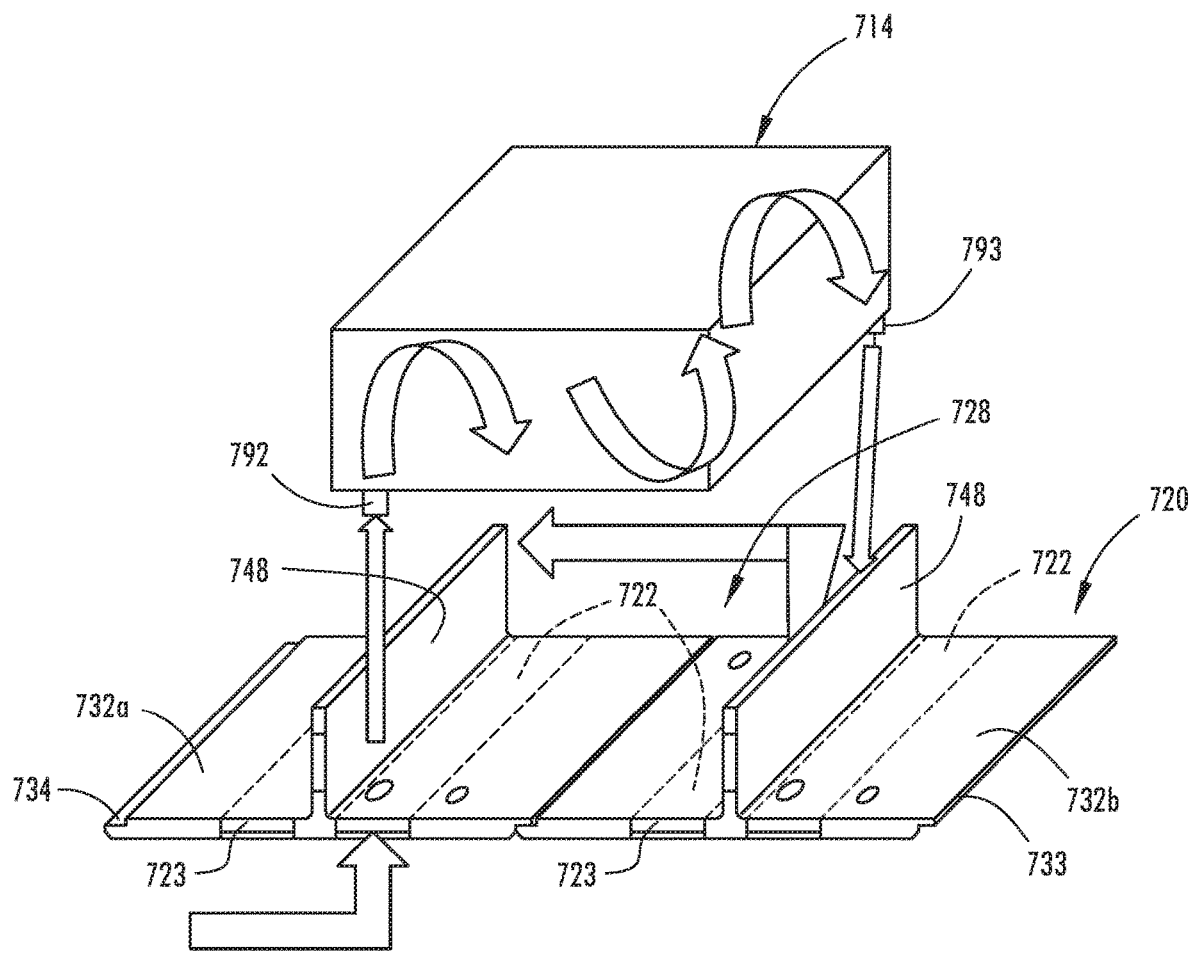
FIG. 20 is an exploded upper perspective view of an additional example of a cooling system integrated with a floor structure and battery of a battery support tray.

With reference to another example of integrating cooling features with a tray floor structure 720, such as shown in FIG. 20, a battery module 714 has an inlet 792 and an outlet 793 that are engaged with coolant channels 722 disposed in the tray floor structure 720. Instead of passing coolant through channels in the floor structure 720 to create a cold plate, the structural channels 722 in the tray structure 720 pass coolant to the battery module 714 itself. As shown in FIG. 20, the channels 722 extend laterally across the tray, similar to those shown in FIG. 3.

As illustrated in FIG. 20, the tray floor structure 720 may have panel sections 732a, 732b that each include the same or similar cross-sectional profile that is taken transverse to the direction of formation and that is substantially consistent laterally across a width of the tray floor structure 720. The illustrated panel sections may attach together at seams, such as via welding, where the seams may also extend laterally across the width of the tray floor structure 720. As shown in FIG. 20, the seams 730 may be an overlapping or interlocking connection, such as to assist in welding or attaching in a manner that provides a water-tight seal. The illustrated seam overlap has a flange 733 that protrudes from a lower edge area of the panel section and an upward protruding recess 734 at the lower edge area of the adjacent panel section, such that the flange 733 is configured to mate with the recess 734.

The panel sections 732a, 732b, such as shown in FIG. 20, may each have a cross member 748 portion that integrally extends upward from the base portion of the panel section. The structure of the cross member portion 748 may stiffen the base portion of the panel for supporting the battery weight, may provide cross-car load transfer paths for lateral impacts and the like, and may serve as a contamination barrier between sections of the battery containment area 728, among other potential purposes. Accordingly, the shape and thickness of the cross member portions 748 of the panels may be configured for the desire characteristics, such as based on the battery module layout, tray design, and design of the base portion of the floor structure.

With further reference to FIG. 20, the panel sections 732a, 732b may attach between peripheral frame members of the tray structure, where the panel that at least partially form a peripheral sidewall that borders the battery containment area. It is understood that the attachment of the panel sections to each other and to the side reinforcement members may be done by various forms of welding, adhesive, fasteners, or the like or combinations thereof to provide a stable and sealed attachment interface. The peripheral frame members may have hollow interiors that engage with the channels 722 of the panel sections 732a, 732b at the interface, such as similar to the interface shown in FIG. 7. However, each panel section may have an end portion of one of the channels 722 that is plugged, such as with a plug member 723, to entirely or substantially prevent the follow the coolant through the plugged channel. The adjacent channel 722 in the adjacent panel section may however be open, such as to allow coolant to flow into the channel of the panel section from the peripheral member. For example, the panel section 732a may have an open channel 722 to receive coolant, while the adjacent channel 722 of the adjacent panel section 732b may have a plug member 723. Thus, the battery containment area 728 between the cross member portions 748 may receive a batter module 714 that engages the adjacent coolant channels 722, such as via quick disconnect (QD) connectors at the inlet 792 and the outlet 793 of the batter module 714. In this arrangement, the coolant flows into the inlet 792, circulates through the battery module 714, and exits through another QD connector at the outlet 793 disposed at the other end of the battery module 714. This coolant then exits the battery module into the channel 722 with the plugged end and flows in the floor and out to the return channel disposed at the opposing frame member or side rail.

In example shown in FIG. 20, aluminum extruded floor panels with integrated cross-car members and cooling channels can accommodate any vehicle width by simply varying the length of the extrusion. Also, the length of the battery enclosure could be incrementally changed by the trim and number of floor panels used. Depending on the type of cooling method used, aluminum or composite materials could be used to tailor the design for cost, weight and performance.

It is also contemplated that additional embodiments of a tray floor structure may be formed by pultruding various types of fibers through a resin to provide a composite-based structure. Such a pultruded tray floor structure may have openings or channels formed within and along its consistent cross-sectional shape, which may function as coolant channels, such as by providing the openings or channels with pipes or conduit liners or the like. Moreover, the battery tray may be formed with more or fewer tray sections from the embodiments disclosed herein.

Several different attachment techniques and configurations may be used to permanently or releasable secure the battery support structure to a vehicle frame, such as below a floor of the vehicle and generally between the axles. Further, with respect to the general installation or attachment or formation, the steps discussed herein may be performed in various different sequences from those discussed to result in engaging, disengaging, or forming the battery support structure or components thereof.

For purposes of this disclosure, the terms "upper," "lower," "right," "left," "rear," "front," "vertical," "horizontal," and derivatives thereof shall relate to the orientation shown in FIG. 1. However, it is to be understood that various alternative orientations may be provided, except where expressly specified to the contrary. It is also to be understood that the specific devices and processes illustrated in the attached drawings, and described in this specification are simply exemplary embodiments of the inventive concepts defined in the appended claims. Hence, specific dimensions and other physical characteristics relating to the embodiments disclosed herein are not to be considered as limiting, unless the claims expressly state otherwise.

Changes and modifications in the specifically described embodiments may be carried out without departing from the principles of the present disclosure, which is intended to be limited only by the scope of the appended claims as interpreted according to the principles of patent law. The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A battery support tray for a vehicle, said battery support tray comprising:
   a peripheral sidewall comprising a pair of tray frame members that border opposing sides of a battery containment area; and
   a tray floor structure comprising a plurality of elongated floor sections disposed parallel and adjacent to each other and each having a length spanning between the pair of tray frame members below the battery containment area,
   wherein the plurality of elongated floor sections each comprise a cross-sectional profile that is consistent along the length of the respective elongated floor section,
   wherein the cross-sectional profile of each of the plurality of elongated floor sections comprises (i) a panel portion having an upper surface that thermally couples with battery modules in the battery containment area and (ii) a conduit portion integrally formed with the panel portion and disposed below the panel portion, and
   wherein the conduit portion of the cross-sectional profile encloses a coolant channel that integrally extends along the length of the respective elongated floor section.

2. The battery support tray of claim 1, wherein the length of each of the plurality of elongated floor sections extends laterally across a width of the tray floor structure.

3. The battery support tray of claim 2, wherein each of the plurality of elongated floor sections comprises an aluminum extrusion.

4. The battery support tray of claim 1, wherein the coolant channels comprise a circular cross-sectional shape.

5. The battery support tray of claim 1, wherein the coolant channels are disposed at a vertically offset position that is closer to the upper surface of the tray floor structure than a lower, downward-facing surface.

6. The battery support tray of claim 1, wherein ends of the plurality of elongated floor sections are attached at the pair of tray frame members.

7. The battery support tray of claim 1, wherein the coolant channels fluidly connect with a longitudinal channel in the pair of tray frame members.

8. The battery support tray of claim 1, wherein each of the plurality of elongated floor sections comprises a cross member portion integrally extending upward from the panel portion and spanning laterally across the tray floor structure between the pair of tray frame members.

* * * * *

UNITED STATES PATENT AND TRADEMARK OFFICE
CERTIFICATE OF CORRECTION

PATENT NO. : 11,155,150 B2
APPLICATION NO. : 17/009237
DATED : October 26, 2021
INVENTOR(S) : Mark Charles Stephens et al.

It is certified that error appears in the above-identified patent and that said Letters Patent is hereby corrected as shown below:

On the Title Page

The Related U.S. Application Data for PCT/US2019/019964:
Please change: "Feb. 28, 2020" to: -- Feb. 28, 2019 --.

Signed and Sealed this
Fourth Day of October, 2022

Katherine Kelly Vidal
*Director of the United States Patent and Trademark Office*